(12) United States Patent
Lyu et al.

(10) Patent No.: US 12,407,553 B2
(45) Date of Patent: Sep. 2, 2025

(54) FLEXIBLE REFERENCE SYMBOL PATTERN FOR WIRELESS COMMUNICATION

(71) Applicant: HUAWEI TECHNOLOGIES CO., LTD., Guangdong (CN)

(72) Inventors: Yongxia Lyu, Ottawa (CA); Jianglei Ma, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 436 days.

(21) Appl. No.: 17/894,541

(22) Filed: Aug. 24, 2022

(65) Prior Publication Data
US 2022/0407756 A1 Dec. 22, 2022

Related U.S. Application Data

(63) Continuation of application No. PCT/CN2020/119945, filed on Oct. 9, 2020.

(51) Int. Cl.
*H04L 27/26* (2006.01)
*H04L 5/00* (2006.01)
*H04L 25/02* (2006.01)

(52) U.S. Cl.
CPC ........ *H04L 27/2613* (2013.01); *H04L 5/0048* (2013.01); *H04L 27/26025* (2021.01); *H04L 5/001* (2013.01); *H04L 25/0224* (2013.01)

(58) Field of Classification Search
CPC ........... H04L 27/2613; H04L 27/26025; H04L 5/0048; H04L 5/0053
See application file for complete search history.

(56) References Cited

U.S. PATENT DOCUMENTS

| 10,412,745 B2 | 9/2019 | Fodor et al. |
| 2019/0037509 A1 | 1/2019 | Li et al. |

(Continued)

FOREIGN PATENT DOCUMENTS

| CN | 107787567 A | 3/2018 | |
| EP | 3487241 A1 * | 5/2019 | .......... H04J 11/0069 |

(Continued)

OTHER PUBLICATIONS

Huawei, HiSilicon et al., "On wide channel bandwidth for NR", 3GPP TSG RAN WG4 Meeting NR Spokane, USA, 17 Jan. 19, 2017, R4-1700114, 7 pages.

(Continued)

*Primary Examiner* — Robert C Scheibel
(74) *Attorney, Agent, or Firm* — Slater Matsil, LLP

(57) ABSTRACT

A reference sequence may be transmitted in wireless communication, e.g. in order to perform channel estimation. The use of a reference sequence introduces overhead. In some embodiments, the subcarrier spacing (SCS) of the multi-carrier symbols (e.g. OFDM symbols) used to transmit one or more reference sequences is different from the SCS of the multi-carrier symbols used to transmit information (e.g. data). In some embodiments, an original reference sequence may be spread over multiple multi-carrier symbols, with each multi-carrier symbol carrying a respective reference sequence that is a portion of the original reference sequence. The technical benefit is possibly improved channel estimation because the original reference sequence is spread in time, but with the same overhead (in terms of total occupied time of reference symbols) as transmitting all of the original reference sequence at the same time.

20 Claims, 20 Drawing Sheets

(56) References Cited

U.S. PATENT DOCUMENTS

| | | |
|---|---|---|
| 2019/0097859 A1 | 3/2019 | Bala et al. |
| 2019/0109695 A1* | 4/2019 | Kim .................... H04L 5/0048 |
| 2020/0036470 A1* | 1/2020 | Olesen ............... H04L 27/0008 |
| 2020/0204325 A1 | 6/2020 | Liu et al. |
| 2021/0160029 A1* | 5/2021 | Cao .................... H04L 27/2613 |
| 2021/0392022 A1* | 12/2021 | Iwai .................... H04J 13/0062 |
| 2022/0103318 A1 | 3/2022 | Ji et al. |

FOREIGN PATENT DOCUMENTS

| | | | | |
|---|---|---|---|---|
| WO | WO-2018064608 A1 * | 4/2018 | ....... | H04L 27/26025 |
| WO | WO-2018128870 A2 * | 7/2018 | ........... | H04L 5/0051 |
| WO | 2018225927 A1 | 12/2018 | | |
| WO | 2020052380 A1 | 3/2020 | | |
| WO | 2020167081 A1 | 8/2020 | | |

OTHER PUBLICATIONS

"3rd Generation Partnership Project; Technical Specification Group Radio Access Network; NR; Physical channels and modulation (Release 15)". Technical Specification. 3GPP TS 38.211 V16.6.0. (Jun. 2019), 97 pages.

"3rd Generation Partnership Project; Technical Specification Group Radio Access Network; Evolved Universal Terrestrial Radio Access (E-UTRA); Physical channels and modulation (Release 12)". Technical Specification. 3GPP TS 36.211 V12.4.0. (Dec. 2014), 124 pages.

NTT DOCOMO et al: "Views on domodulation RS design for NR access technology", R1-165178, (May 14, 2016), XP051096225, total 7 pages.

* cited by examiner

452

| Index | Ratio of SCS for Reference Symbols to SCS for Data Symbols | Reference Symbol Position(s) |
|---|---|---|
| 1 | 1:1 | 1 (e.g. FIG. 10) |
| 2 | 2:1 | 2, 14 (e.g. FIG. 12) |
| 3 | 3:1 | 3, 8, 13 (e.g. FIG. 13) |
| 4 | 4:1 | 1, 6, 12, 17 (e.g. FIG. 14) |

454

| Index | Ratio of SCS for Reference Symbols to SCS for Data Symbols | Reference Symbol Position(s) |
|---|---|---|
| 1 | 1:1 | 1 |
| 2 | 2:1 | 1, L |
| 3 | 3:1 | 1, L-3, L |
| 4 | 4:1 | 1, L-6, L-3, L |

FIG. 18

| Index | Ratio of IDFT size for Reference Symbols to IDFT size for Data Symbols | Reference Symbol Position(s) |
|---|---|---|
| 1 | 1:1 | 1 (e.g. FIG. 10) |
| 2 | 1:2 | 2, 14 (e.g. FIG. 12) |
| 3 | 1:3 | 3, 8, 13 (e.g. FIG. 13) |
| 4 | 1:4 | 1, 6, 12, 17 (e.g. FIG. 14) |

FLEXIBLE REFERENCE SYMBOL PATTERN FOR WIRELESS COMMUNICATION

CROSS-REFERENCE TO RELATED APPLICATION

The present application is a continuation of PCT/CN2020/119945, titled "Flexible Reference Symbol Pattern for Wireless Communication", filed on Oct. 9, 2020, and incorporated herein by reference.

FIELD

The present application relates to wireless communication, and more specifically to the transmission of reference sequences.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources, typically referred to as "time-frequency resources".

Two devices that wirelessly communicate with each other over time-frequency resources need not necessarily be a UE and a base station. For example, two UEs may wirelessly communicate with each other over a sidelink using device-to-device (D2D) communication. As another example, two network devices (e.g. a terrestrial base station and a non-terrestrial base station, such as a drone) may wirelessly communicate with each other over a backhaul link.

When wireless communication occurs between two devices, the device performing the transmitting will be referred to as the transmitting device, and the device performing the receiving will be referred to as the receiving device. A single device might be both a transmitting device and a receiving device, e.g. if the single device performs transmission and reception. An example of a device may be a UE, a base station, or another network device. When a UE and base station are communicating with each other, during an uplink transmission the UE is the transmitting device and the base station is the receiving device, and during a downlink transmission the UE is the receiving device and the base station is the transmitting device.

When two devices wirelessly communicate with each other, a reference sequence may be transmitted over the wireless channel from the transmitting device to the receiving device. The reference sequence may be used by the receiving device to perform channel estimation. The reference sequence has values known in advance by the receiving device. The receiving device uses the received reference sequence to perform channel estimation for the channel over which the reference sequence was received. The channel estimation may then be used by the receiving device for decoding information (e.g. control information and/or data) received from the transmitting device on that channel.

A reference sequence may be carried in a multi-carrier symbol or in a single-carrier symbol. The time-frequency location of the one or more symbols carrying one or more reference sequences in a transmission may be referred to as the reference symbol pattern.

A multi-carrier symbol carrying a reference sequence will be referred to as a reference symbol. A multi-carrier symbol carrying information (such as data or control information) will be referred to as an information symbol.

In some wireless communication systems, e.g. in long-term-evolution (LTE), the reference symbol pattern may be predefined in a standard. In some wireless communication systems, e.g. in new radio (NR), additional reference symbols may be configured, and the reference symbol pattern may depend upon the time domain location of the current transmission.

In any case, the use of references symbols introduces overhead, at least because its transmission occupies time-frequency resources that could otherwise be used to transmit information, such as data or control information. When designing and implementing reference symbol patterns, impact on overhead is a consideration.

SUMMARY

Discrete Fourier Transform (DFT) spreading may sometimes be performed on symbols transmitted on a multi-carrier waveform, in order to try to result in a lower peak-to-average power ratio (PAPR) waveform. For example, DFT spreading may be utilized when communicating on high frequency bands. In some scenarios, the DFT spreading is only performed on the information symbols, i.e. symbols carrying information such as control information and/or data. DFT spreading might not be performed on reference symbols, e.g. because the one or more reference sequences carried by the one or more reference symbols may already be designed to have relatively low PAPR. When DFT spreading is performed on the information symbols, the resulting multi-carrier symbols (e.g. OFDM symbols) typically carry only information. A reference sequence is not frequency division multiplexed with information in a multi-carrier symbol. Instead, the one or more reference sequences are transmitted in one or more other multi-carrier symbols that are time division multiplexed with the multi-carrier symbols that carry the information. That is, reference symbols are time division multiplexed with information symbols. For example, a particular time duration, e.g. time slot, may have a length equal to 14 OFDM symbols. Each OFDM symbol may either be an information symbol (carrying information and not a reference sequence) or a reference symbol (carrying a reference sequence). The overhead associated with reference symbols may therefore possibly become a concern. For example, if it is desired to have reference symbols spread across multiple different time locations within the time slot, e.g. to assist with better channel estimation, then the reference symbols may occupy the entirety of several OFDM symbols, each at a different time location, which may result in relatively high reference symbol overhead.

Systems and methods are disclosed herein in which the subcarrier spacing (SCS) of the multi-carrier symbols (e.g. OFDM symbols) used to transmit the reference sequences is different from the SCS of the multi-carrier symbols used to transmit the information (e.g. data and/or control information). That is, the SCS of the reference symbols is different from the SCS of the information symbols. If the SCS of a reference symbol is larger than the SCS of a information symbol, then (assuming a same bandwidth) fewer symbols of a reference sequence may be transmitted in the reference symbol compared to the number of symbols of information transmitted in an information symbol. However, the length of a reference symbol is shorter than the length of an information symbol.

In some embodiments, the reference symbols may have a larger SCS (and therefore shorter length) than the information symbols. The reference symbols may be time-division multiplexed with the information symbols such that reference symbols are spread in time over a particular time duration. Each reference symbol may carry a respective reference sequence. In some embodiments, the reference sequence carried by each reference symbol is different. In some embodiments, some or all of the reference symbols carry a same reference sequence. In some embodiments, each reference symbol may carry a reference sequence that is a portion of an original reference sequence, e.g. the original reference sequence was M symbols, and each one of the reference symbols carries a respective different set of M/k symbols of the original reference sequence.

The technical benefit is possibly improved channel estimation because the reference symbols are spread in time, but with the same overhead (in terms of total occupied time of reference symbols) as transmitting a single reference symbol having a longer length.

For example, a particular time duration, e.g. time slot, may have a length equal to 14 OFDM symbols at a SCS of 15 kHz. Each OFDM symbol at the SCS of 15 kHz can transmit M symbols. For OFDM symbols used to transmit information (e.g. data and/or control information), each one of those OFDM symbols transmits M symbols of information at the SCS of 15 kHz. Instead of using one of the 14 OFDM symbols as a reference symbol to carry M symbols of a reference sequence at a SCS of 15 KHz, the SCS of a reference symbol is increased to 30 KHz, which means that only M/2 symbols of a reference sequence are transmitted in the OFDM symbol, but at half the time duration. Therefore, the single OFDM symbol of 15 kHz SCS is replaced with two OFDM symbols of 30 kHz SCS. The two OFDM symbols of 30 kHz SCS may each be transmitted at a different time location within the time slot. The total overhead of reference symbol length remains the same, but the reference symbols are spread across different time locations within the time slot rather than all transmitted at the same time within the time slot.

In some embodiments, reference symbol overhead may be semi-statically or dynamically reduced using different SCS. For example, in the example above if it is not necessary to transmit M symbols of a reference sequence in the time slot, then one of the two OFDM symbols of 30 kHz SCS may be used to transmit M/2 symbols of a reference sequence, and the other OFDM symbol of 30 kHz SCS may be used to transmit information (e.g. data and/or control information). That is, one of the reference symbols may be used as an information symbol (having 30 kHz SCS).

The SCS of a multi-carrier symbol, such as an OFDM symbol, may be modified by changing the size of the inverse-DFT (IDFT), e.g. as discussed herein.

In some embodiments, a method for wireless communication includes obtaining an indication of a first SCS or first IDFT size used for transmission of one or more first multi-carrier symbols that carry one or more reference sequences. The method further includes communicating (e.g. transmitting or receiving) the one or more first multi-carrier symbols based on the first SCS or first IDFT size. The method may further include communicating (e.g. transmitting or receiving) one or more second multi-carrier symbols that carry information and that each have a second SCS or second IDFT size. In some embodiments, the first SCS may be indicated by indicating a ratio of the first SCS and the second SCS. In some embodiments, the first IDFT size may be indicated by indicating a ratio of the first IDFT size and the second IDFT size.

Note that the terms "length", "duration", and "time duration" will be used interchangeably herein. The word "length" refers to length in the time domain, i.e. length in time.

BRIEF DESCRIPTION OF THE DRAWINGS

Embodiments will be described, by way of example only, with reference to the accompanying figures wherein:

FIGS. 18 and 19 illustrate mappings to reference symbol patterns, according to various embodiments.

DETAILED DESCRIPTION

For illustrative purposes, specific example embodiments will now be explained in greater detail below in conjunction with the figures.

Example Communication Systems and Devices

Figure 1:
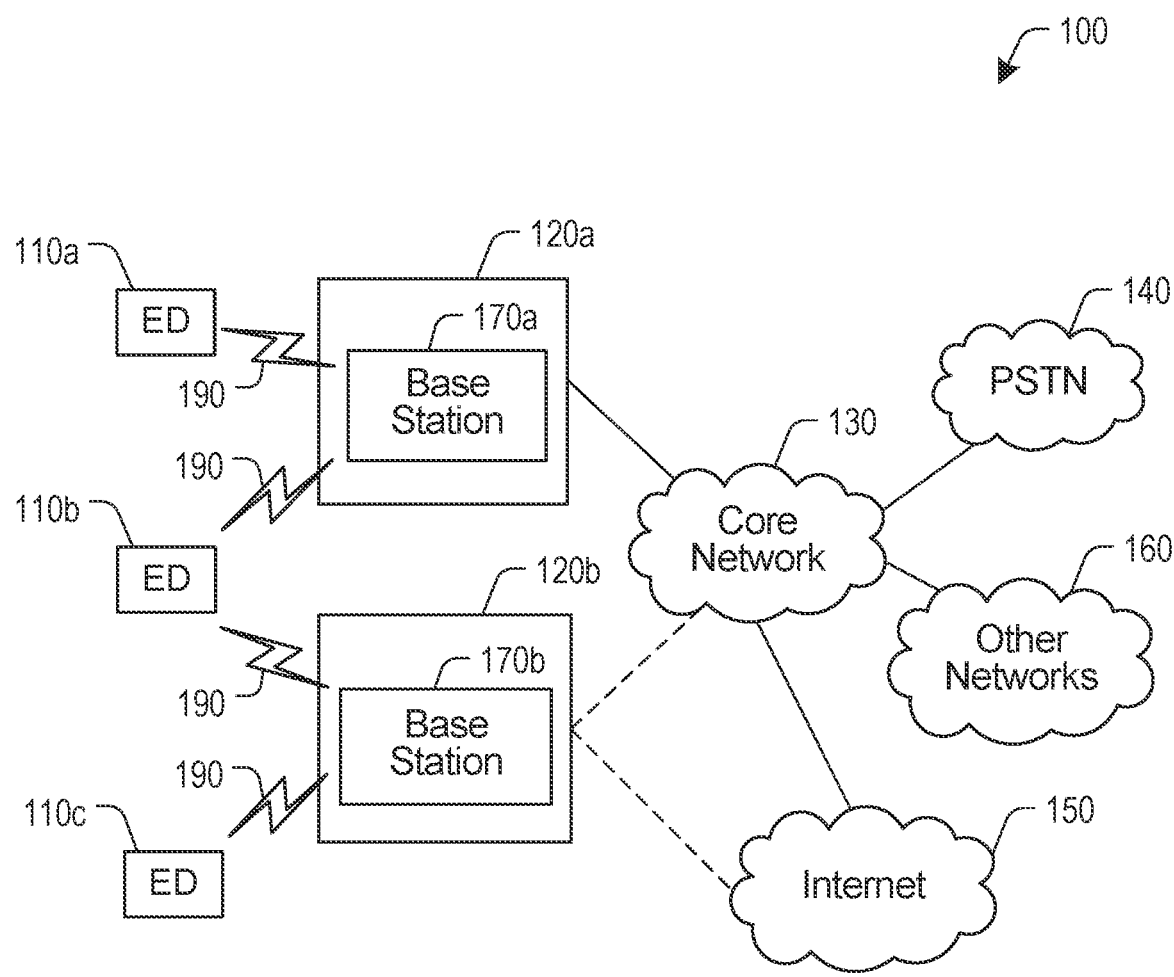
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, multicast, unicast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, consumer electronics device, car, truck, bus, train, drone, etc.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
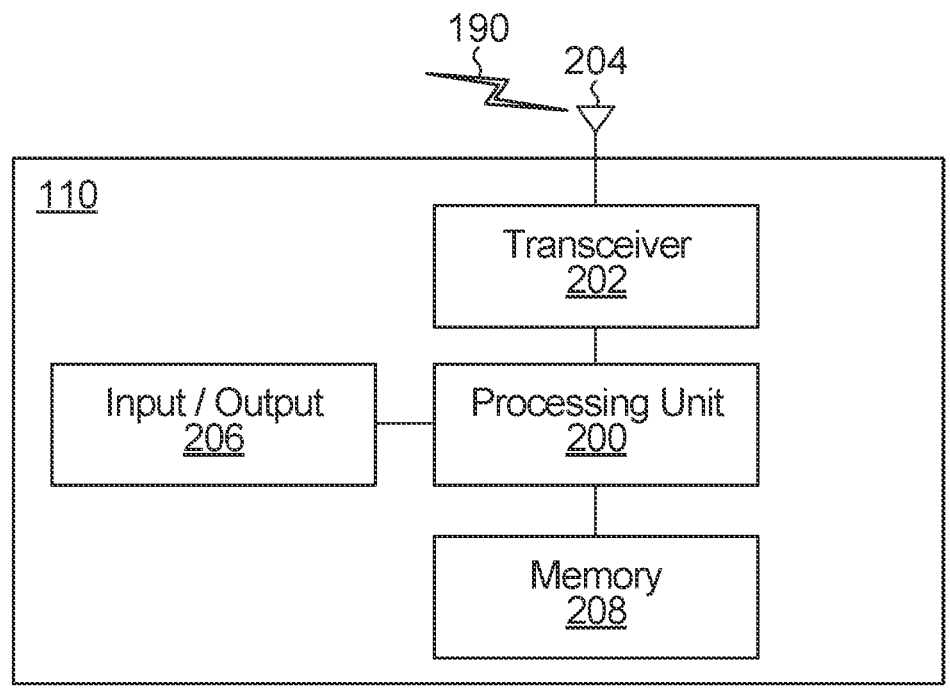
FIG. 2 is a block diagram of an example electronic device.
Figure 3:
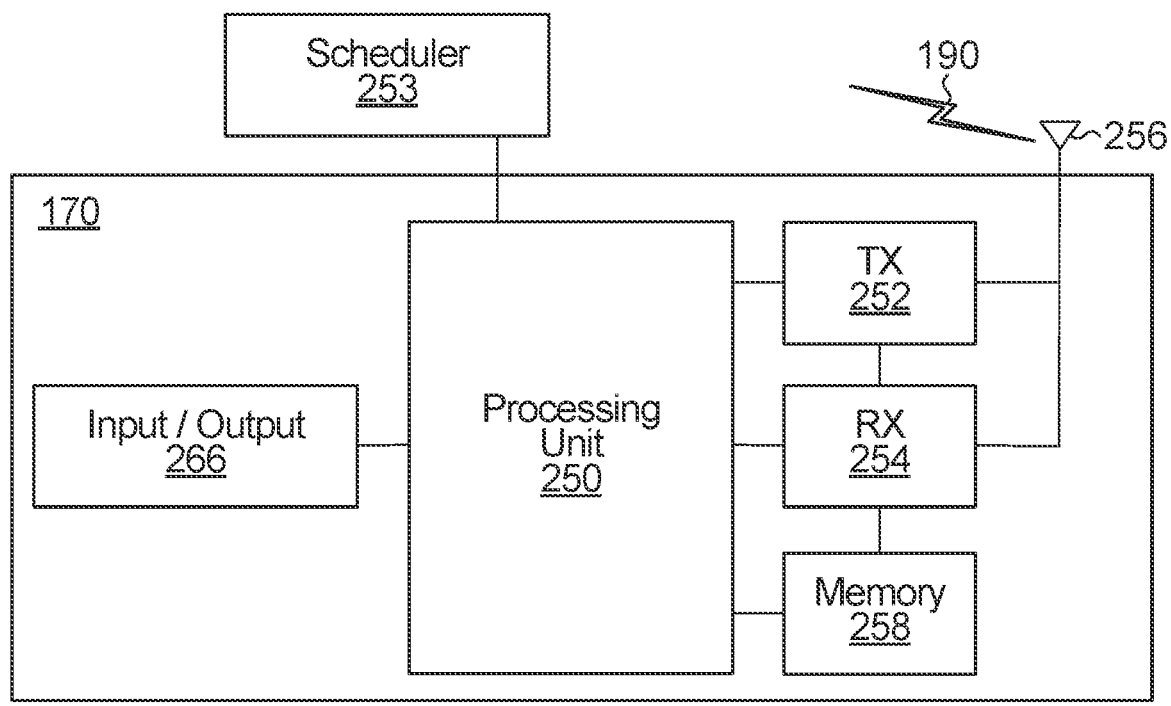
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
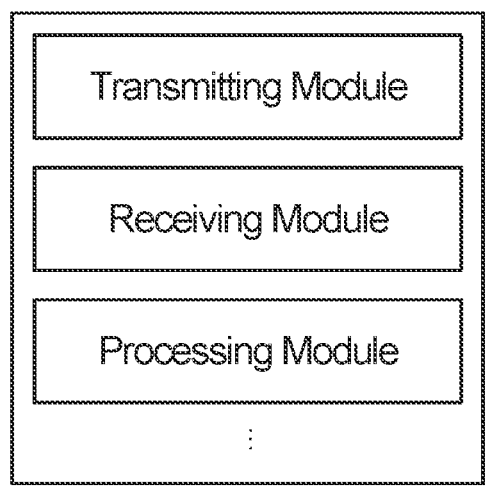
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, in particular the processor 210 or processor 260. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
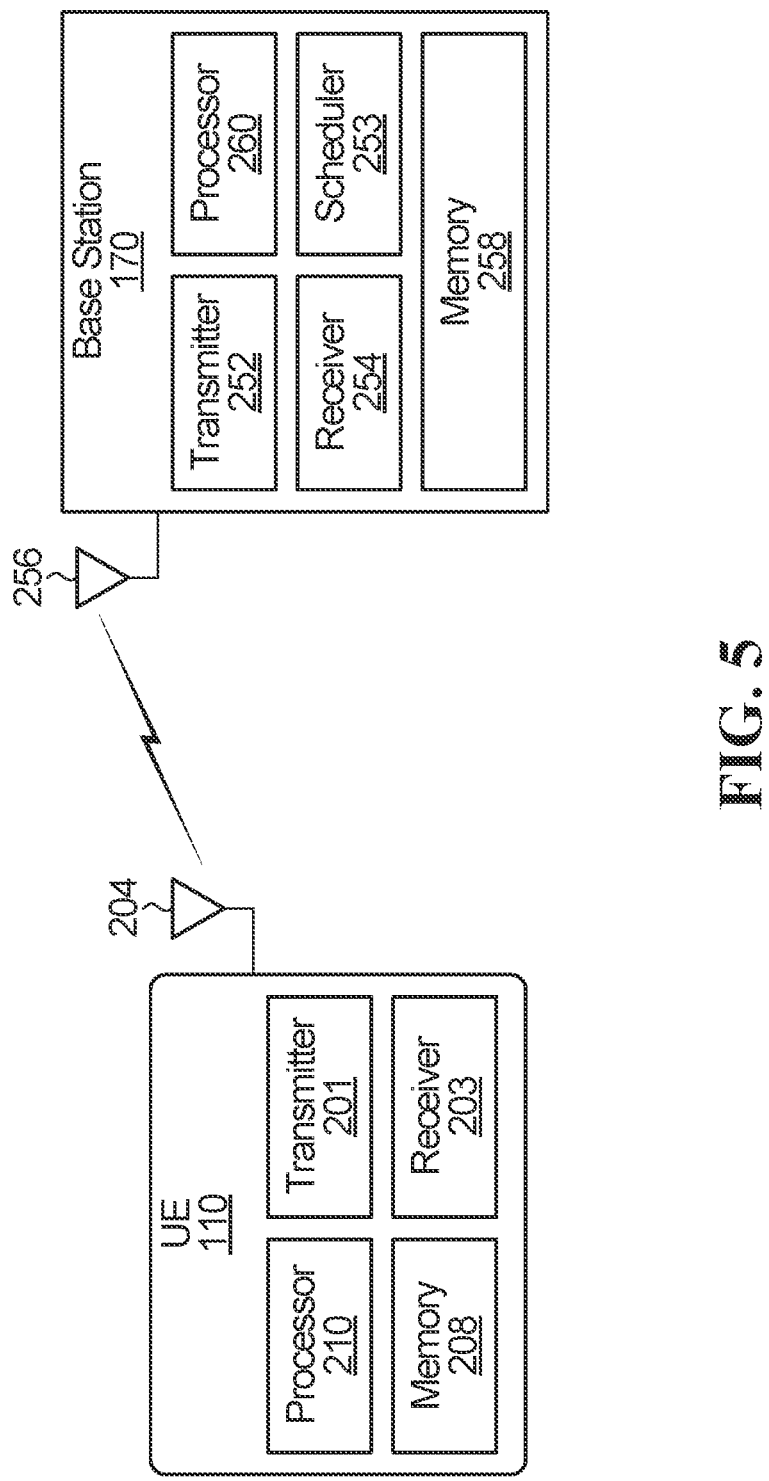
FIG. 5 is a block diagram of an example user equipment and base station.

FIG. 5 illustrates another example of an ED 110 and a base station 170. The ED 110 will hereafter be referred to as a user equipment (UE) 110.

The base station 170 may be called other names in some implementations, such as a transmit-and-receive point (TRP), a transmit-and-reception point, a base transceiver station, a radio base station, a network node, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation (scheduling), message generation, and encoding/decoding, and that are not necessarily part of the equipment housing the antennas and/or panels of the base station 170. For example, the modules that are not necessarily part of the equipment housing the antennas/panels of the base station 170 may perform the generation of multi-carrier symbols described later in relation to FIGS. 7 to 9. The modules may also be coupled to other base stations. In some embodiments, the base station 170 may actually be a plurality of base stations that are operating together to serve the UE 110, e.g. through coordinated multipoint transmissions. In some embodiments, some or all of the base station 170 may be non-terrestrial, e.g. mounted on a flying device, such as a drone.

The base station 170 includes a transmitter 252 and a receiver 254 coupled to one or more antennas 256. Only one antenna 256 is illustrated. One, some, or all of the antennas may alternatively be panels. The transmitter 252 and the receiver 254 may be integrated as a transceiver. The base station 170 further includes a processor 260 for performing operations including those related to preparing a transmission for downlink transmission to the UE 110, and those related to processing uplink transmissions received from the UE 110. Processing operations related to preparing a transmission for downlink transmission may include operations such as encoding, modulating, precoding (e.g. MIMO precoding), beamforming, and possibly generating the reference symbol patterns described herein. Processing operations related to processing uplink transmissions may include operations such as beamforming, demodulating, decoding, and possibly detecting the reference symbols described herein. The base station 170 further includes a scheduler 253, which may schedule the uplink resources to be allocated to UE 110 for uplink transmissions, and which may also schedule downlink transmissions. The base station 100 further includes a memory 258 for storing information.

Although not illustrated, the processor 260 may form part of the transmitter 252 and/or receiver 254. Also, although not illustrated, the processor 260 may implement the scheduler 253.

The processor 260, the scheduler 253, and the processing components of the transmitter 252 and receiver 254 may each be implemented by the same or different one or more processors that are configured to execute instructions stored in a memory (e.g. in memory 258). Alternatively, some or all of the processor 260, the scheduler 253, and the processing components of the transmitter 252 and receiver 254 may be implemented using dedicated circuitry, such as a programmed field-programmable gate array (FPGA), a graphical processing unit (GPU), or an application-specific integrated circuit (ASIC).

The UE 110 also includes a transmitter 201 and a receiver 203 coupled to one or more antennas 204. Only one antenna 204 is illustrated. One, some, or all of the antennas may alternatively be panels. The transmitter 201 and the receiver 203 may be integrated as a transceiver, e.g. transceiver 202 of FIG. 2. The UE 110 further includes a processor 210 for performing operations including those related to preparing a transmission for uplink transmission to the base station 170, and those related to processing downlink transmissions received from the base station 170. Processing operations related to preparing a transmission for uplink transmission may include operations such as encoding, modulating, precoding (e.g. MIMO precoding), beamforming, and possibly generating the reference symbol patterns described herein. Processing operations related to processing downlink transmissions may include operations such as beamforming, demodulating, decoding, and possibly detecting the reference symbols described herein.

Although not illustrated, the processor 210 may form part of the transmitter 201 and/or receiver 203.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a FPGA, a GPU, or an ASIC.

The base station 170 and the UE 110 may include other components, but these have been omitted for the sake of clarity.

The UE 110 may sometimes act as a transmitting device and may sometimes act as a receiving device. Similarly, the base station 170 may sometimes act as a transmitting device and may sometimes act as a receiving device. As explained earlier, transmitting and receiving devices are not necessarily limited to UEs and/or base stations, and a transmitting and a receiving device may be the same type of device (e.g. both UEs or both network devices).

Figure 6:
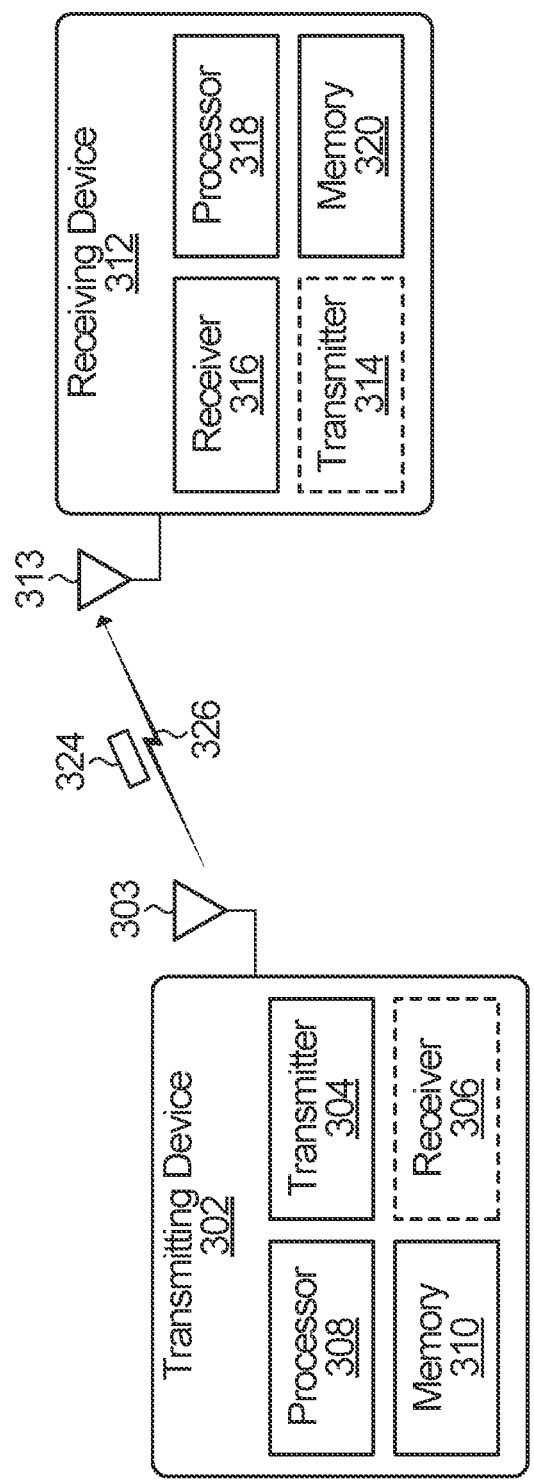
FIG. 6 is a block diagram of an example transmitting device and receiving device.

FIG. 6 illustrates a transmitting device 302 and a receiving device 312, according to one embodiment. The transmitting device 302 might be a UE (e.g. UE 110) or a base station (e.g. base station 170) or another device, depending upon the implementation. The receiving device 312 might be a UE (e.g. UE 110) or a base station (e.g. base station 170) or another device, depending upon the implementation.

The transmitting device 302 includes a transmitter 304 and optionally a receiver 306. The receiver 306 is included if the transmitting device 302 can also act as a receiving device. If a transmitter and receiver are both included, then they may be integrated as a transceiver. The transmitter 302 is coupled to one or more antennas 303. Only one antenna 303 is illustrated. One, some, or all of the antennas may alternatively be panels.

The transmitting device 302 further includes a processor 308 for generating the transmission to be sent by the transmitter 304. For example, the processor 308 generates the multi-carrier symbols disclosed herein, e.g. the information symbols and reference symbols described herein. Although not illustrated, the processor 308 may form part of the transmitter 304. The transmitting device 302 further includes a memory 310 for storing information.

The processor 308 and processing components of the transmitter 304 may be implemented by the same or different one or more processors that are configured to execute instructions stored in a memory (e.g. in memory 310). Alternatively, some or all of the processor 308 and/or processing components of the transmitter 304 may be implemented using dedicated circuitry, such as a programmed FPGA, a GPU, or an ASIC.

If the transmitting device 302 is UE 110, then the processor 308 may be or include processor 210, the transmitter 304 may be or include transmitter 201, the receiver 306 (if present) may be or include receiver 203, and the memory 310 may be or include memory 208. If the transmitting device 302 is base station 170, then the processor 308 may be or include processor 260 and/or scheduler 253, the transmitter 304 may be or include transmitter 252, the receiver 306 (if present) may be or include receiver 254, and the memory 310 may be or include memory 258.

The receiving device 312 includes a receiver 316 and optionally a transmitter 314. The transmitter 314 is included if the receiving device 312 can also act as a transmitting device. If a transmitter and receiver are both included, then they may be integrated as a transceiver. The receiver 316 is coupled to one or more antennas 313. Only one antenna 313 is illustrated. One, some, or all of the antennas may alternatively be panels.

The receiving device 312 further includes a processor 318 for processing the transmission received by the receiving device 312, e.g. detecting the reference symbols, performing channel estimation using the references symbols, and decoding information (e.g. data or control information). Although not illustrated, the processor 318 may form part of the receiver 316. The receiving device 312 further includes a memory 320 for storing information.

The processor 318 and processing components of the receiver 316 may be implemented by the same or different one or more processors that are configured to execute instructions stored in a memory (e.g. in memory 320). Alternatively, some or all of the processor 318 and/or processing components of the receiver 316 may be implemented using dedicated circuitry, such as a programmed FPGA, a GPU, or an ASIC.

If the receiving device 312 is UE 110, then the processor 318 may be or include processor 210, the transmitter 314 (if present) may be or include transmitter 201, the receiver 316 may be or include receiver 203, and the memory 320 may be or include memory 208. If the receiving device 312 is base station 170, then the processor 318 may be or include processor 260 and/or scheduler 253, the transmitter 314 (if present) may be or include transmitter 252, the receiver 316 may be or include receiver 254, and the memory 320 may be or include memory 258.

In FIG. 6, a transmission 324 is illustrated as being transmitted by transmitting device 302 over channel 326. The transmission 324 may be any of the transmissions described herein having reference symbol patterns, e.g. any of those illustrated in FIGS. 10 to 17.

The transmitting device 302 and the receiving device 312 may include other components, but these have been omitted for the sake of clarity.

Generation of Multi-Carrier Symbols

Figure 7:
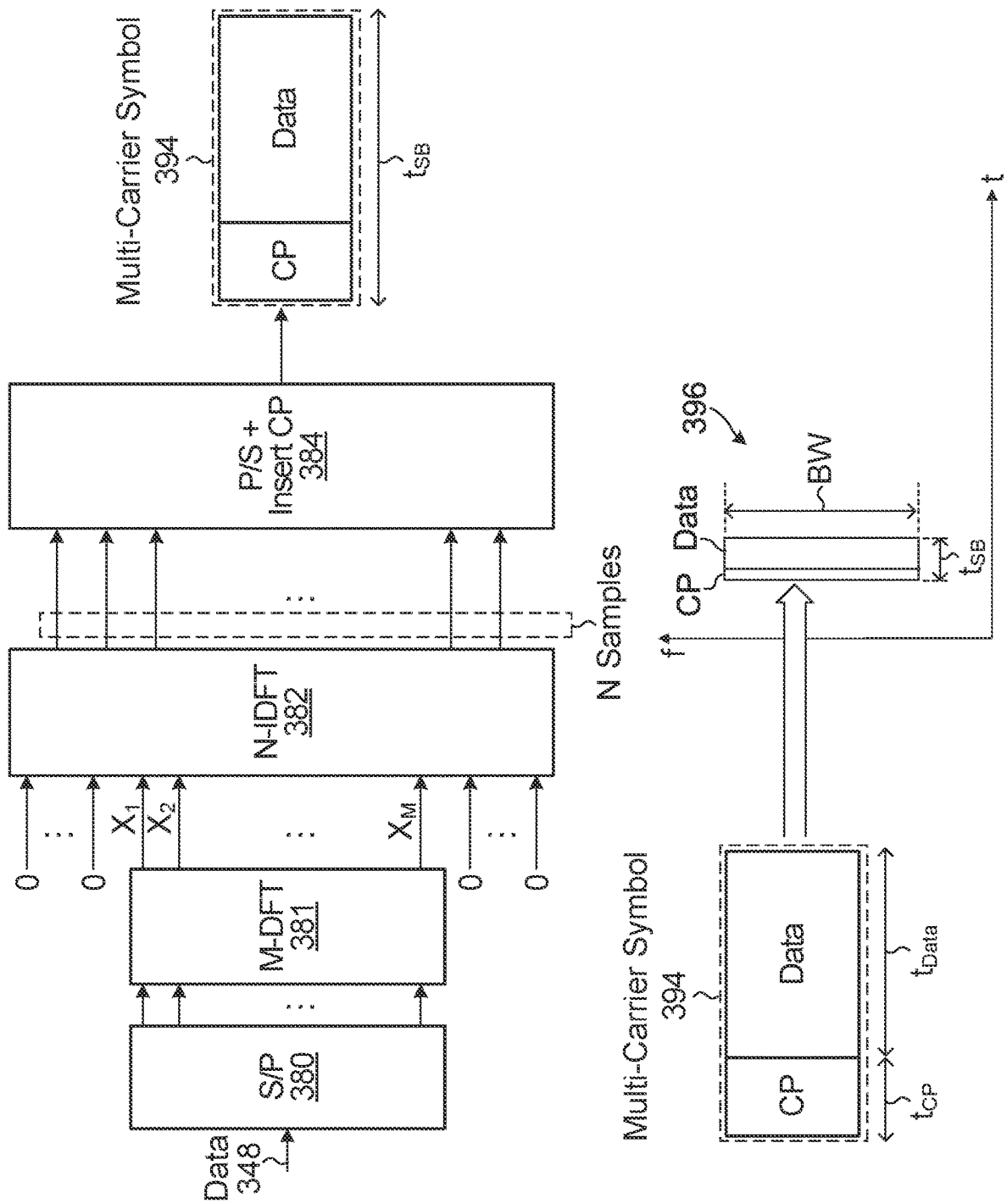
FIGS. 7 to 9 illustrate generation of information symbols and reference symbols, according to various embodiments.

FIG. 7 illustrates generation of a multi-carrier symbol 394, according to one embodiment. In the embodiment illustrated in FIG. 7, DFT spreading is performed.

Data 348 is input into a serial-to-parallel convertor 380. More generally, the data 348 may be information. That is, although "data" is used in embodiments below, more generally it may be information. Information may encompass data, but also may encompass other information not typically called "data", such as control information.

Data 348 first undergoes serial-to-parallel conversion in the serial-to-parallel convertor 380, followed by DFT spreading by DFT spreader 381. The DFT spreader has size M, resulting in an output of M frequency-domain samples $X_1$ to $X_M$. Each frequency-domain samples $X_1$ to $X_M$ is for transmission on a respective different subcarrier frequency, and the subcarriers have a particular subcarrier spacing (SCS). The frequency-domain samples $X_1$ to $X_M$ undergo inverse discrete Fourier transform (IDFT) 382 (which may be implemented as an inverse fast Fourier transform (IFFT) in some embodiments) to result in N time-domain sample outputs, where N is a natural number greater than or equal to M, followed by parallel-to-serial conversion and CP insertion 384. CP insertion is optional in all embodiments described herein, including in FIGS. 7 to 9. A multi-carrier symbol 394 is thereby generated and may be transmitted as part of transmission 324 by transmitting device 302 over channel 326. The multi-carrier symbol 394 is sometimes alternatively referred to as a symbol block, or symbol. An example of a multi-carrier symbol 394 is an OFDM symbol. The multi-carrier symbol 394 carries the frequency-domain samples $X_1$ to $X_M$, each on a respective different subcarrier, over a symbol duration $t_{SB}$. Therefore, M different subcarriers are transmitted, which have a particular SCS. If a CP portion is present, as illustrated, the CP portion may be a repeat of the data portion present at the end of the multi-carrier symbol 394, although this is not necessary. The multi-carrier symbol 394 is transmitted over a particular bandwidth (or partial bandwidth or bandwidth partition), as shown at 396. The bandwidth may occupy part of a designated bandwidth (or bandwidth partition) or a carrier. The components illustrated and operations described in relation to FIG. 7 may be implemented by processor 308 of the transmitting device 302.

In FIG. 7, the multi-carrier symbol 394 is multi-carrier, i.e. a multi-carrier waveform is used to transmit the multi-carrier symbol 394. That is, the symbols of data (and CP, if present) are transmitted on multiple subcarriers, with the symbols of data being transmitted in parallel on M different subcarriers. As mentioned above, an OFDM symbol is an example of a multi-carrier symbol. If the input 348 is an information bit sequence, rather than modulation symbols, then symbol mapping may also be performed in order to transform the bits into modulation symbols. The symbol mappers are not illustrated. If present, a symbol mapper may be implemented by a modulator, e.g. a QAM modulator.

FIG. 7 illustrates the generation of an information symbol, which in FIG. 7 is multi-carrier symbol 394 that carries data.

Figure 8:
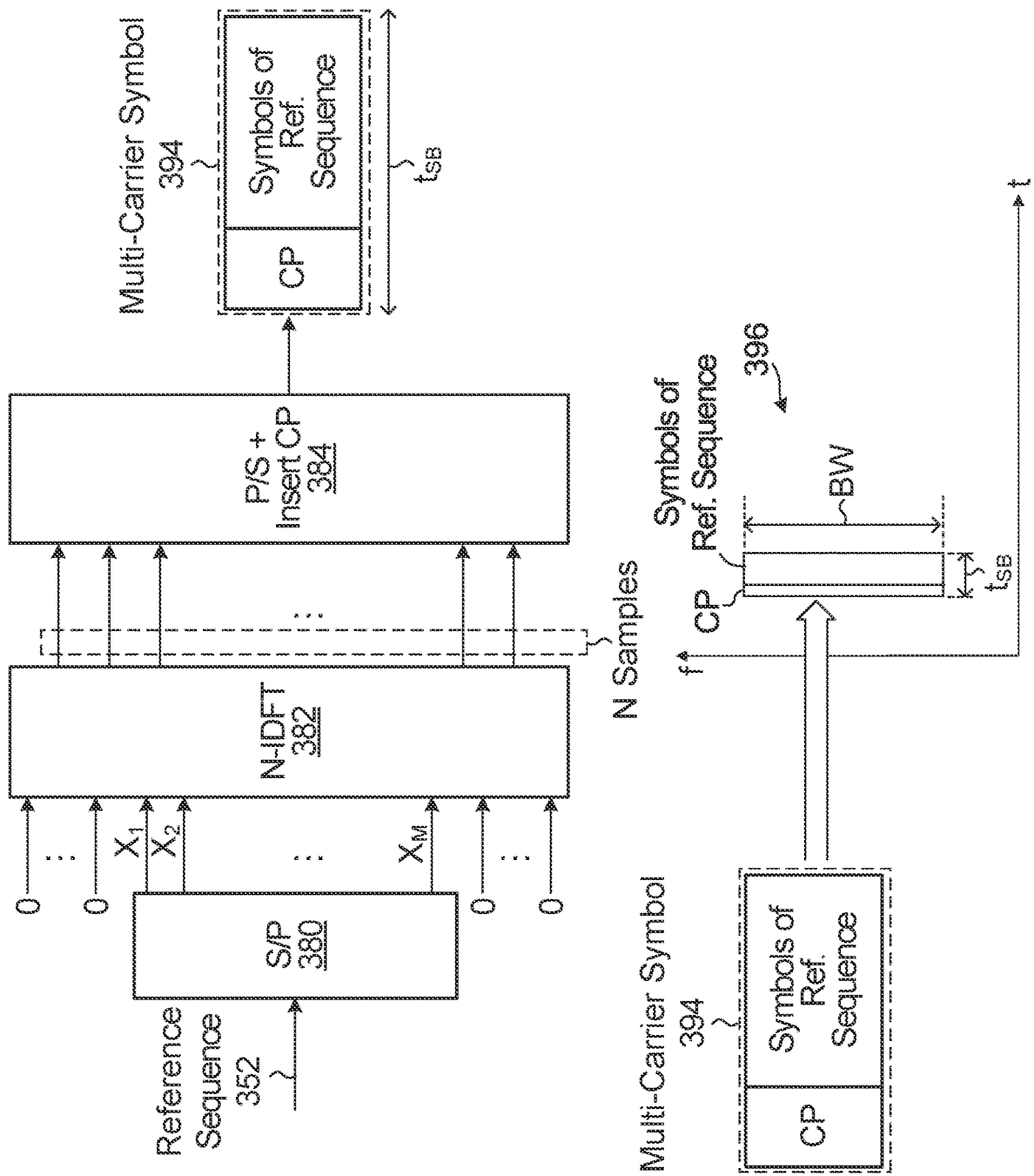

FIG. 8 illustrates a variation of FIG. 7 in which the multi-carrier symbol 394 is instead a reference symbol, i.e. it instead carries symbols of a reference sequence. That is, $X_1$ to $X_M$ in FIG. 8 are frequency-domain samples of a reference sequence (referred to as symbols of a reference sequence), rather than symbols of data. Because the reference sequence is already designed to have relatively low PAPR, DFT spreading is not performed. The DFT spreader 381 is therefore omitted from FIG. 8, e.g. it may be bypassed. In another embodiment, DFT spreading may be performed for a reference sequence, e.g. if the same procedure is used for reference symbols and information symbols with no performance loss because of performing the DFT spreading.

The size of the IDFT 382 refers to the number of output samples N of the IDFT 382. The size of the IDFT 382 affects the length of the multi-carrier symbol 394 for a given sampling frequency. In particular, the larger the size of the IDFT 382 (i.e. the larger N), the longer the duration $t_{SB}$ of the multi-carrier symbol 394 because there are more output samples to be transmitted. The size of the IDFT 382 also directly impacts the number of symbols (M) that can be transmitted in the multi-carrier symbol 394, as well as the SCS, assuming the bandwidth over which the multi-carrier symbol 394 is transmitted is fixed. A smaller IDFT size N means that fewer symbols can be transmitted in the multi-carrier symbol 394, which means the SCS is farther apart, i.e. larger, because fewer subcarriers are being used over the same bandwidth. For example, assume N=1024, M=600, and SCS=15 kHz. If the IDFT size N is then reduced to N=512, then M=300, which means that half the symbols are transmitted in the multi-carrier symbol 394. Assuming the bandwidth remains the same, then the SCS is therefore twice as far apart (i.e. twice as large) to spread the 300 symbols over the same frequency range as the original 600 symbols. That is, the SCS is 30 kHz instead of 15 kHz. The SCS may therefore be changed by changing IDFT size N. A reduction in IDFT size N results in a corresponding increase in SCS.

Figure 9:
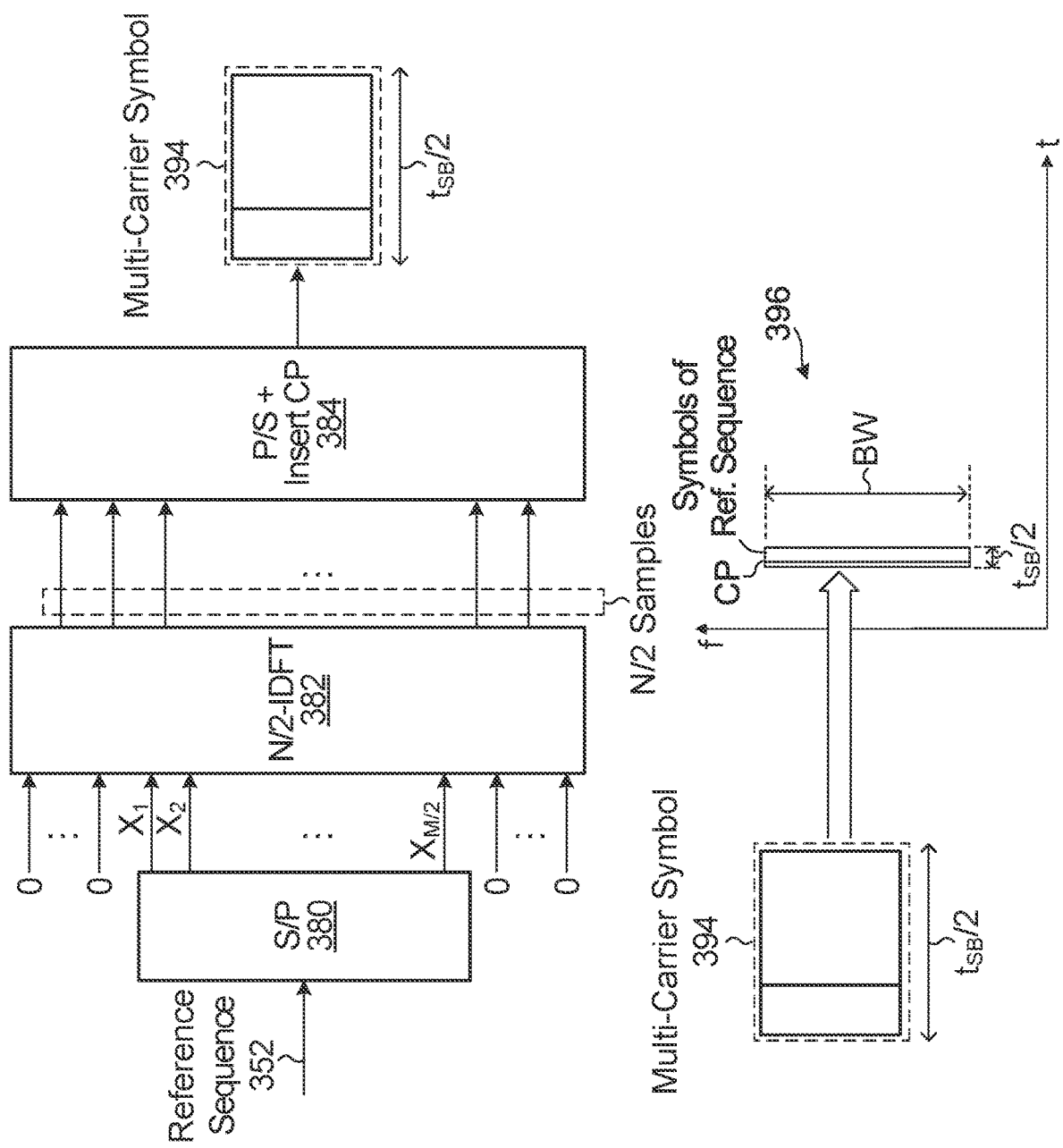

FIG. 9 illustrates a variation of FIG. 8 in which the SCS in FIG. 9 is doubled compared to the SCS in FIG. 8. To implement the doubling of the SCS, the IDFT size N is halved to instead be N/2. The multi-carrier symbol 394 therefore has length $t_{SB}/2$, and only M/2 symbols $X_1$ to $X_{M/2}$ of the reference sequence are transmitted in the multi-carrier symbol 394.

Implementing Reference Symbol Patterns Using Different SCS

In the embodiments described below in relation to FIGS. 10 to 19, the notation used above will be maintained: a multi-carrier symbol transmitting only symbols of a reference sequence will be referred to as a "reference symbol". A multi-carrier symbol transmitting only symbols of information will be referred to as a "data symbol", although (as explained earlier) a "data symbol" can more generally be called an "information symbol" because it might not carry only data, but could also or instead carry other information, such as control information. With reference to FIGS. 7 to 9, the multi-carrier symbol 394 in FIG. 7 is a data symbol, and multi-carrier symbol 394 in FIG. 8 and FIG. 9 is a reference symbol. A reference symbol may alternatively be called a demodulation reference symbol (DMRS).

As shown in FIGS. 7 and 8, DFT spreading might be performed when generating a data symbol but not when generating a reference symbol. When DFT spreading is performed when generating a data symbol, the resulting data symbol 394 carries only data. Therefore, symbols of the reference sequence are not frequency division multiplexed with data in the multi-carrier symbol 394. Instead, symbols of the reference sequence are transmitted in one or more other multi-carrier symbols ("reference symbols") that are time division multiplexed with the multi-carrier symbols that carry the data ("data symbols"). That is, data symbols and reference symbols are separate multi-carrier symbols, and reference symbols are time division multiplexed with data symbols.

The time location of the reference symbols will be referred to as the reference symbol pattern.

Figure 10:
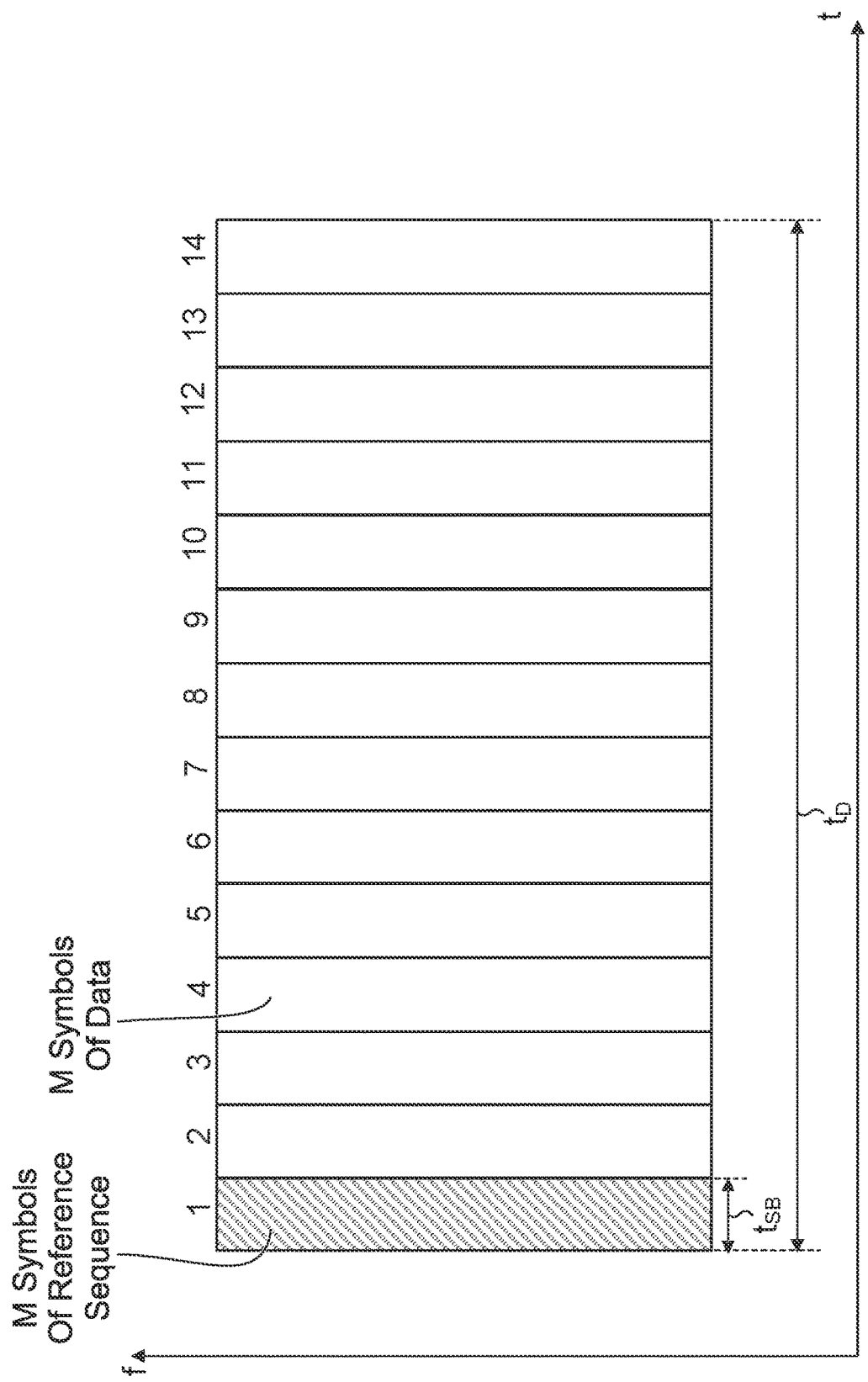
FIGS. 10 to 17 illustrate reference symbol patterns, according to various embodiments.

For example, FIG. 10 illustrates a reference symbol pattern according to one embodiment. A transmission over a time duration $t_D$ is illustrated. The time duration $t_D$ is implementation specific and may be, for example, a scheduled time duration, such as a minimum scheduled time unit. In some embodiments, the time duration $t_D$ may be a subframe or slot or mini-slot or transmission time interval (TTI), etc., depending upon the implementation. During the time duration $t_D$, 14 multi-carrier symbols are transmitted, each at a respective different position 1 to 14. For ease of explanation, the multi-carrier symbols will be assumed to be OFDM symbols in FIG. 10 and further FIGS. 11 to 17. However, in general the multi-carrier symbols are not necessarily OFDM symbols. Also, the inclusion of 14 multi-carrier symbols in time duration $t_D$ is only an example. There may be more or fewer multi-carrier symbols in time duration $t_D$. The same applies to all remaining examples, e.g. a time duration $t_D$ equal to 14 OFDM symbols for carrying data is only an example. In implementation, a time duration $t_D$ may encompass more or fewer OFDM symbols.

Each OFDM symbol has the same SCS, the same duration $t_{SB}$, and each OFDM symbol carries either M symbols of data or M symbols of a reference sequence. That is, each OFDM symbol is either a data symbol that carries M symbols of data or a reference symbol that carries M symbols of a reference sequence. Specifically, the OFDM symbols not shown in cross-hatching, i.e. the OFDM symbols in positions 2 to 14, are data symbols, and are each generated in the manner shown in FIG. 7. The OFDM symbol shown in cross-hatching, i.e. the OFDM symbol in position 1, is a reference symbol, and is generated in the manner shown in FIG. 8. The total reference sequence overhead during the time duration $t_D$ is M symbols, which are all transmitted at once in parallel in a single OFDM symbol. The reference symbol is located at position 1, i.e. the first OFDM symbol in the transmission. In some embodiments, the location of the reference symbol may be at position 1 (as illustrated in FIG. 10) for the uplink (e.g. for the PUSCH) and the location of the reference symbol may be instead be at another position (e.g. at position 4) for the downlink (e.g. for the PDSCH).

Figure 11:
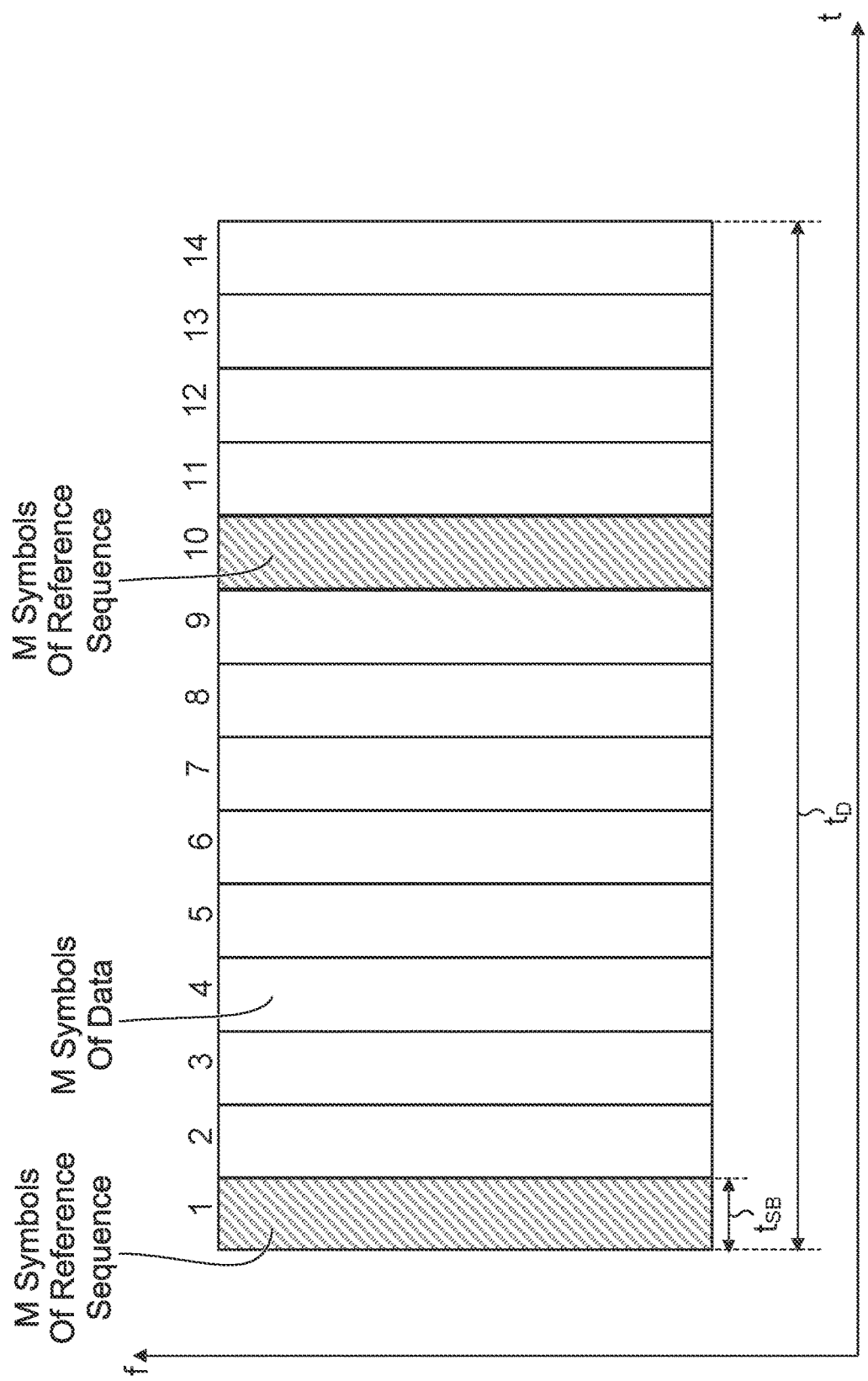

The possible drawback of the reference symbol pattern in FIG. 10 is that the reference sequence is not distributed in time over the time duration $t_D$. Instead, all of the reference sequence is transmitted in a single reference symbol at position 1. Better channel estimation may possibly be performed if multiple reference symbols are transmitted and distributed in time, i.e. at more than one position in time, within time duration $t_D$. One possibility is to have multiple reference symbols in time duration $t_D$ that are the same SCS as the data symbols. An example is FIG. 11, which is a variation of FIG. 10 in which the OFDM symbol at position 10 is also a reference symbol. However, the drawback of FIG. 11 is that reference symbol overhead has doubled compared to FIG. 10 because a total of 2M symbols of a reference sequence are transmitted during time duration $t_D$. Not only are more symbols of a reference sequence transmitted in FIG. 11 compared to FIG. 10, but that also means that fewer data symbols are therefore transmitted in FIG. 11 compared to FIG. 10 over time duration $t_D$.

Instead, in embodiments below, the SCS of reference symbols is increased compared to the SCS of data symbols. In some embodiments, the SCS may be increased in the manner explained in relation to FIG. 9, i.e. by reducing the size of the IDFT used to generate the OFDM symbol. In general, if the IDFT size is reduced from N to N/k, then the SCS is increased by a factor of k. The OFDM symbol generated can carry fewer symbols of a reference sequence, but the duration of the OFDM symbol will also be shorter. For example, an OFDM symbol of duration $t_{SB}$ and carrying M symbols of a reference sequence may be replaced with k OFDM symbols of duration $t_{SB}/k$ each carrying M/k symbols of a reference sequence. The k OFDM symbols may then be distributed in time, i.e. located at different symbol positions, within time duration $t_D$. The following technical benefit may then be achieved: over time duration $t_D$ the same total number of symbols of a reference sequence are transmitted, i.e the overhead of M symbols of a reference sequence remains the same, but the original reference sequence is distributed over time by having multiple shorter OFDM symbols each having a larger SCS. The reference symbol overhead may be measured as the time occupied by the reference symbol(s) during time duration $t_D$ compared to the total time of time duration $t_D$.

Figure 12:
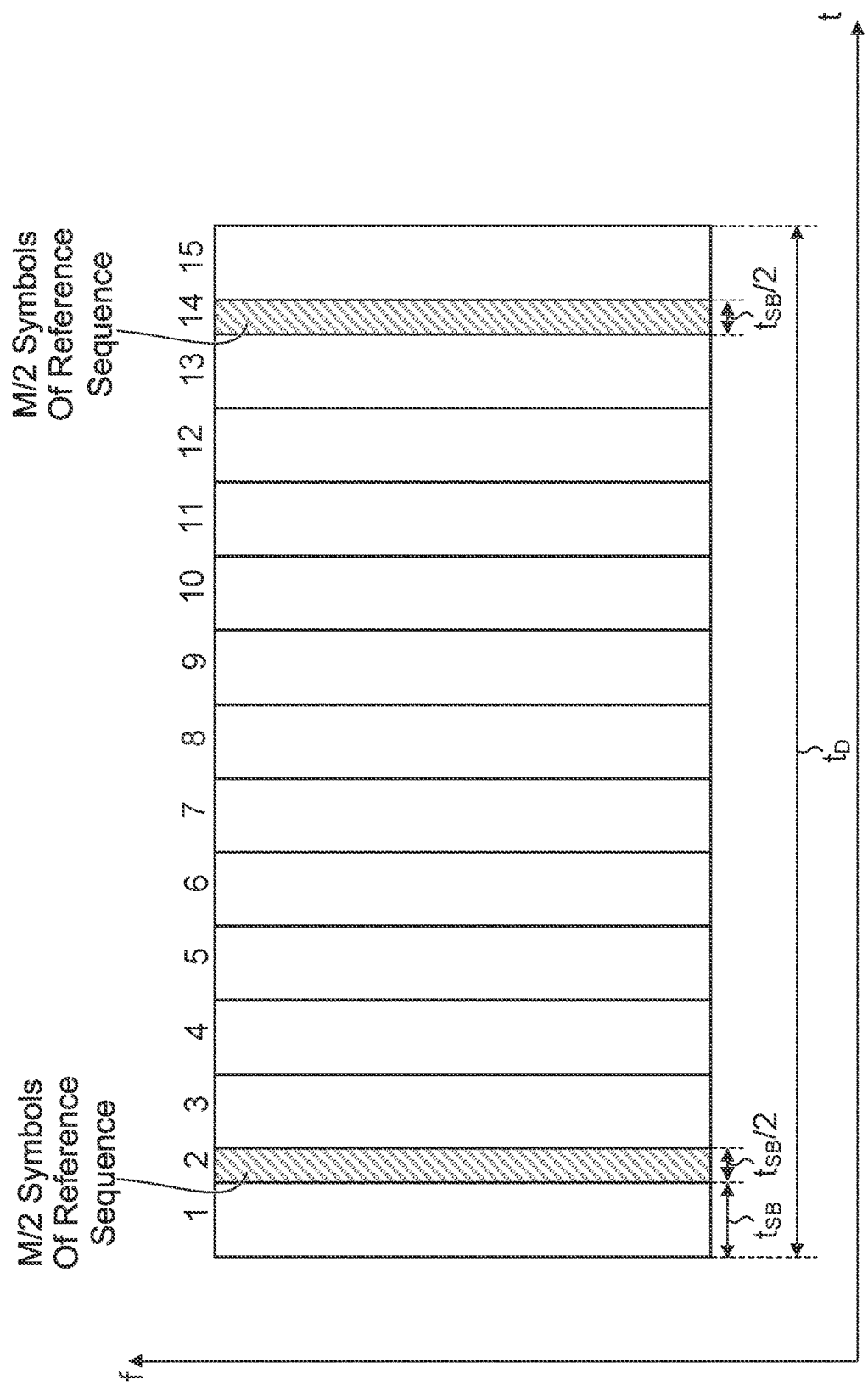

FIGS. 12 to 15 illustrate different example reference symbol patterns according to the principle described above. In FIG. 12, k=2. Instead of 14 OFDM symbols of the same SCS being transmitted over time duration $t_D$, one of the OFDM symbols is replaced with two OFDM symbols having double the SCS and therefore half the duration $t_{SB}/2$. For example, if the SCS for the data symbols is 15 kHz, then the SCS for the reference symbols is 30 kHz. 15 OFDM symbols are instead transmitted during time duration $t_D$. The two OFDM symbols having the larger SCS are distributed in time and each carry a respective different half of the M symbols of an original reference sequence. In FIG. 12, the reference symbols are illustrated as being transmitted in positions 2 and 14, but this is only an example. Also, as described in more detail later, the reference symbol pattern, which is expressed as the positions of the reference symbols, may be predefined by a mapping. For example, the ratio of SCS of reference symbols to SCS of data symbols may be associated with a specific reference symbol pattern. For example, the network may signal to the transmitting device 302 and/or receiving device 312 that the SCS of the reference symbols is twice as large as the SCS of the data symbols, and this may map to the predefined reference symbol pattern illustrated in FIG. 12. For example, if the network indicates that the SCS for reference symbols is twice as large as the SCS for data symbols during time duration $t_D$, then transmitting device 302 and receiving device 312 know that the reference symbols are to be located at positions 2 and 14, as shown in FIG. 12.

In some embodiments, simulations indicate that transmitting the reference symbols in the second symbol and the penultimate symbol (e.g. like in FIG. 12 in which the reference symbols are transmitted in positions 2 and 14) results in the best performance. In some embodiments, simulations indicate that instead transmitting the reference symbols in the first symbol and the last symbol (e.g. FIG. 12 modified to transmit the reference symbols in positions 1 and 15 instead of positions 2 and 14) results in good performance, and possibly the same performance in a slow-variable wireless channel as transmitting the reference symbols in the second and penultimate symbols.

Figure 13:
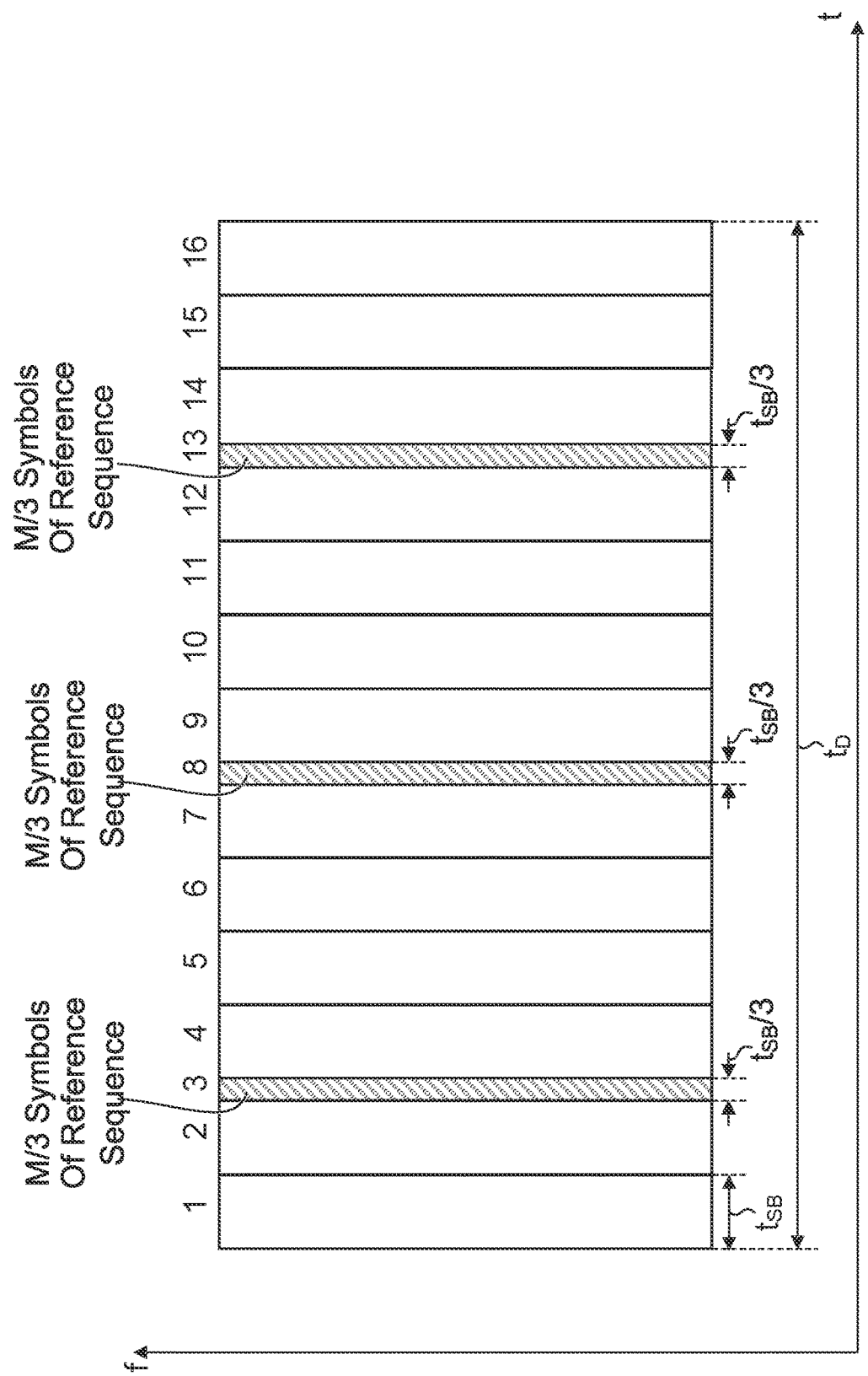

In FIG. 13, k=3. Instead of 14 OFDM symbols of the same SCS being transmitted over time duration $t_D$, one of the OFDM symbols is replaced with three OFDM symbols having three times the SCS and therefore one third the duration $t_{SB}/3$. For example, if the SCS for the data symbols is 15 kHz, then the SCS for the reference symbols is 45 kHz. 16 OFDM symbols are instead transmitted during time duration $t_D$. The three OFDM symbols having the larger SCS are distributed in time and each carry a respective different one third of the M symbols of the original reference sequence. In FIG. 13, the reference symbols are illustrated as being transmitted in positions 3, 8, and 13, but this is only an example.

Figure 14:
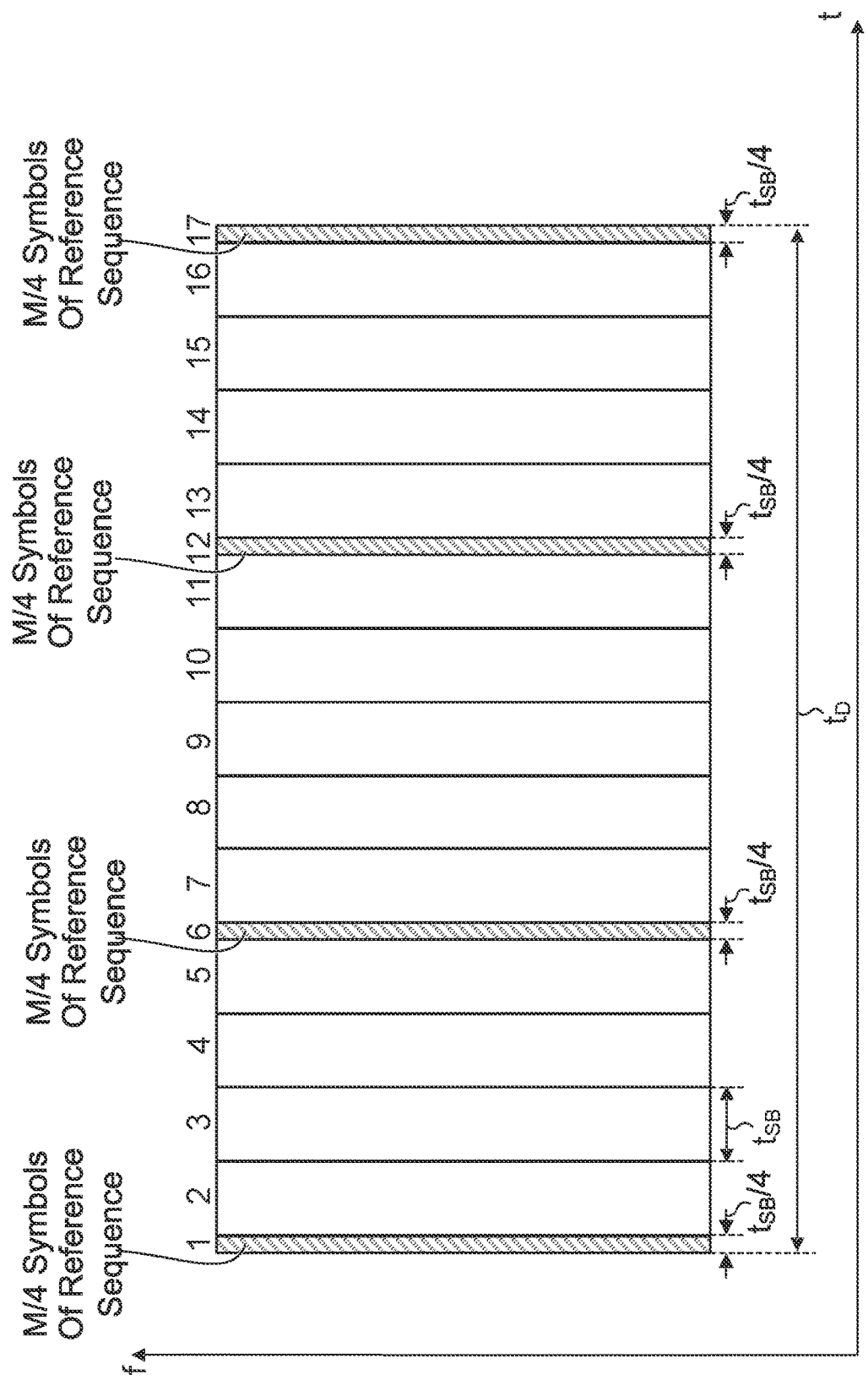

In FIG. 14, k=4. Instead of 14 OFDM symbols of the same SCS being transmitted over time duration $t_D$, one of the OFDM symbols is replaced with four OFDM symbols having four times the SCS and therefore a quarter the duration $t_{SB}/4$. For example, if the SCS for the data symbols is 15 kHz, then the SCS for the reference symbols is 60 kHz. 17 OFDM symbols are instead transmitted during time duration $t_D$. The four OFDM symbols having the larger SCS are distributed in time and each carry a respective different quarter of the M symbols of the original reference sequence. In FIG. 14, the reference symbols are illustrated as being transmitted in positions 1, 6, 12, and 17, but this is only an example.

In the examples in FIGS. 12 to 14, it is assumed that a reference sequence carried by a reference symbol is a fraction of an original reference sequence. More generally, this does not have to be the case. Each reference symbol carries a respective reference sequence. There might be no relation between the reference sequences carried by the different reference symbols. The reference sequence carried by a reference symbol might be the same as or different from the reference sequence carried by one or more other reference symbols.

Figure 15:
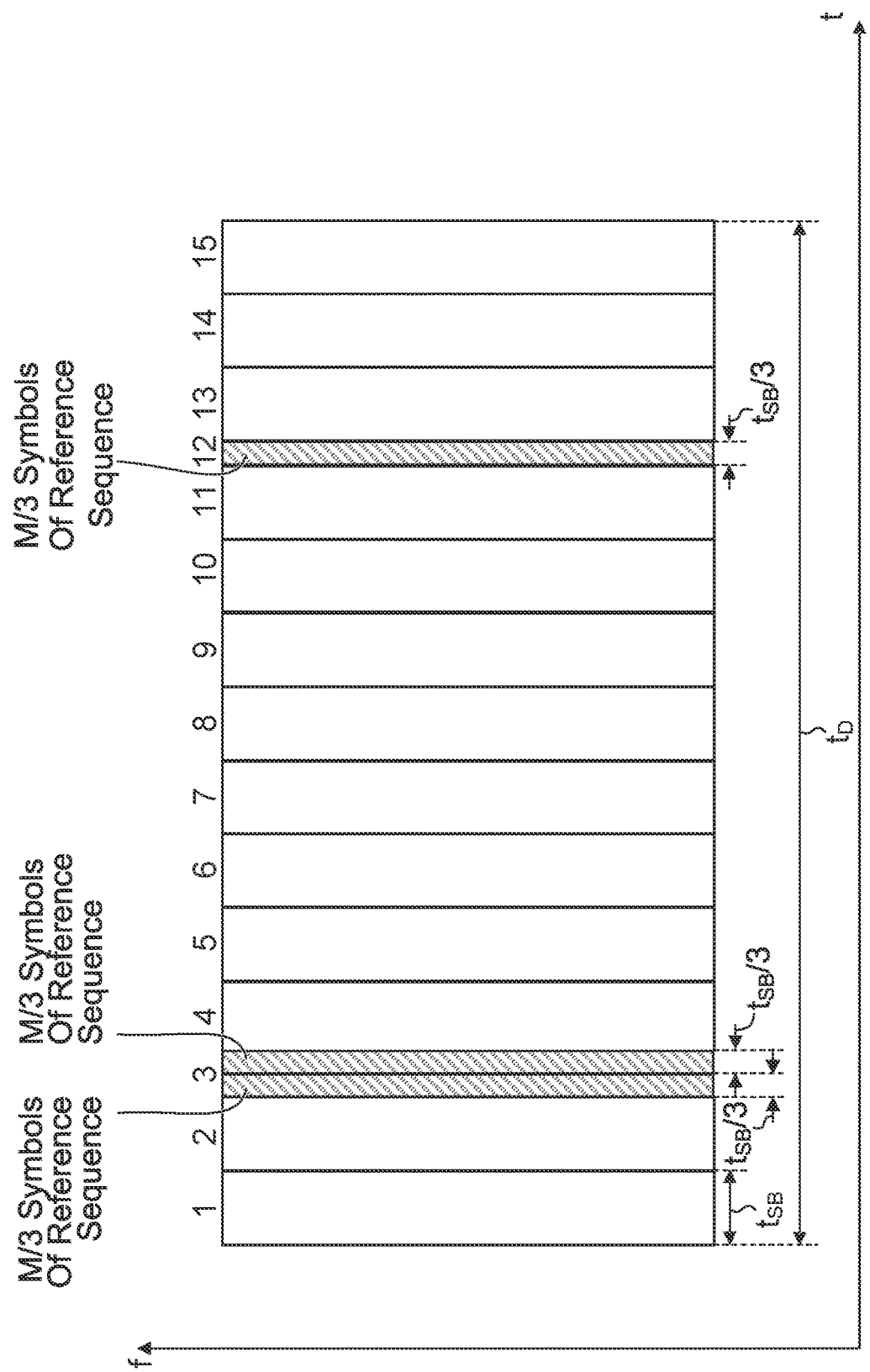

In the examples in FIGS. 12 to 14, only one reference symbol is transmitted at each designated position during time duration $t_D$. In some embodiments, it may be that a position could encompass multiple reference symbols. For example, FIG. 15 illustrates a variation of FIG. 13 in which the time duration $t_D$ is instead partitioned into 15 positions, with position 3 including two adjacent reference symbols. In general, for any of the embodiments herein, the number of adjacent reference symbols at a given position may be configurable. For high frequency ranges, e.g. frequency range 2 (FR2), a given position might only have one reference symbol, e.g. as illustrated in each of the examples in FIGS. 10 to 14.

In the examples in FIGS. 12 to 15, reference symbol overhead remains the same as the example in FIG. 10, except (unlike the example in FIG. 10) reference symbols are distributed in time over time duration $t_D$. Having reference symbols distributed over time duration $t_D$ may allow for the receiving device 312 to perform improved channel estimation, e.g. through time domain interpolation, such as by averaging the channel based on the multiple measurements from the multiple positions in time. For example, the channel estimation performance gain in FIG. 12 may be 1 dB more than in FIG. 10.

Figure 16:
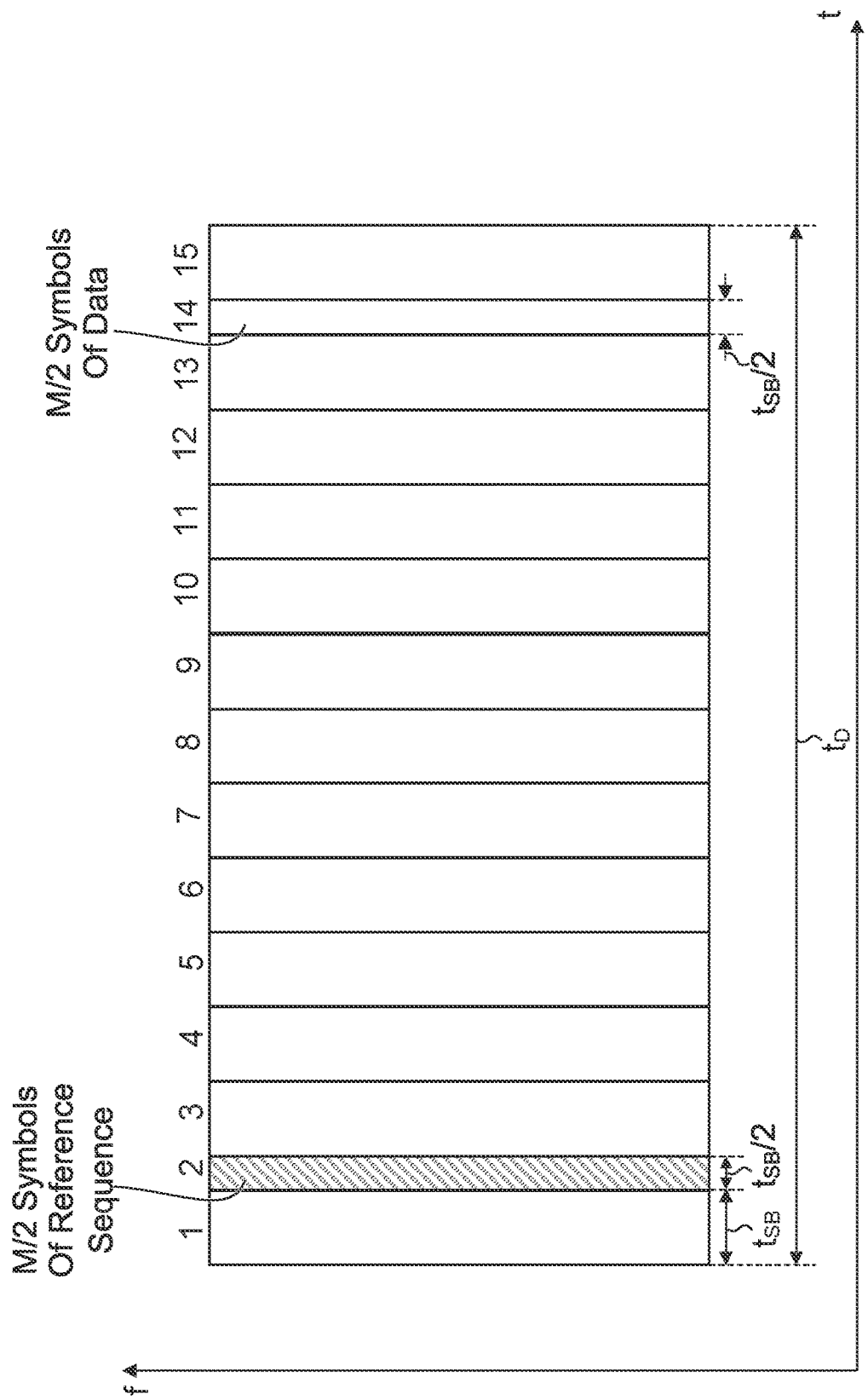

In some embodiments, it might not be necessary to always transmit as many symbols of a reference sequence as normally transmitted during time duration $t_D$, e.g. if the wireless channel 326 between the transmitting device 302 and the receiving device 312 changes slowly and/or is of high quality. In these instances, an OFDM symbol having a larger SCS and normally used as a reference symbol may dynamically or semi-statically be scheduled to instead carry data, thereby reducing reference sequence overhead. For example, FIG. 16 illustrates a variation of FIG. 12 in which the OFDM symbol at position 14 normally used as a reference symbol to transmit M/2 symbols of a reference sequence is instead scheduled as a data symbols that transmits M/2 symbols of data. DFT spreading may be performed on the data transmitted in the OFDM symbol at position 14. The receiving device 312 uses just the M/2 symbols of a reference sequence transmitted at position 2 in order to perform channel estimation. Reference sequence overhead may therefore be reduced in half during time duration $t_D$. If the relative speed between the transmitting device 302 and receiving device 312 subsequently increases and/or the quality of the wireless channel 326 subsequently degrades, in a subsequent transmission during a subsequent time duration $t_D$ the OFDM symbol at position 14 may be returned to a reference symbol, like in FIG. 12.

Figure 17:
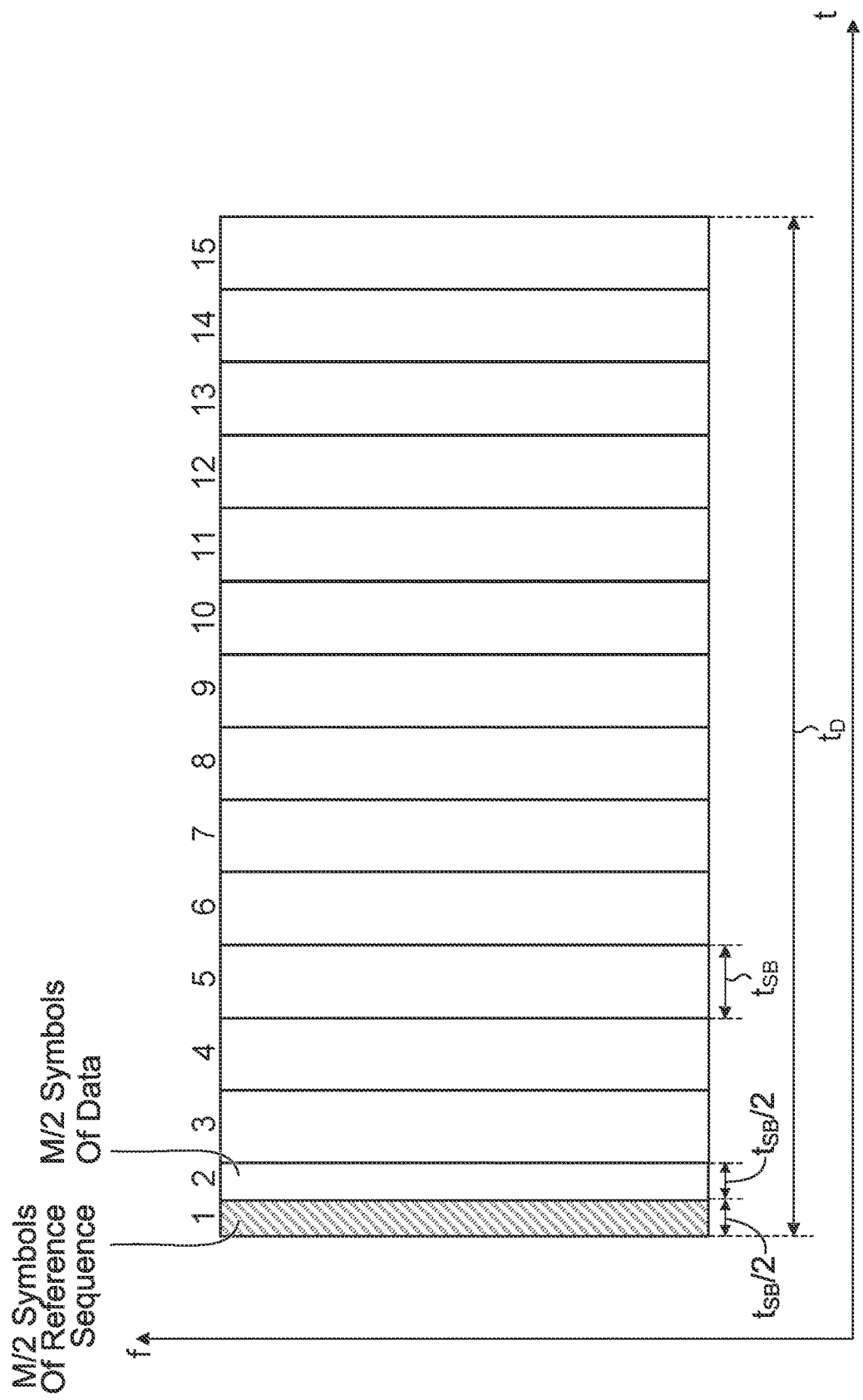

FIG. 17 illustrates a variation of FIG. 16 in which the OFDM symbol at position 2 is instead scheduled as a data symbol that transmits M/2 symbols of data, rather than a reference symbol.

Note that in both FIGS. 16 and 17 the reference symbol is located near or at the start of time duration $t_D$. This is only an example and not necessary. However, by transmitting the reference symbol near or at the start of time duration $t_D$ faster processing for channel estimation may be possible.

FIGS. 16 and 17 illustrate examples in which only M/2 symbols of a reference sequence are transmitted in time duration $t_D$. More generally, only M/k symbols of a reference sequence might be transmitted at a single position in time duration $t_D$, with the remaining positions transmitting data symbols. For example, if k=3 then only the M/3 symbols of a reference sequence at position 3 in FIG. 13 might be transmitted, with the OFDM symbols at positions 8 and 13 of FIG. 13 instead transmitting data symbols. In some embodiments, k may be any natural number, e.g. between 1 and 8 inclusive. In some embodiments, as long as M/k is an integer, M meets the formula of $M=2^a 3^b 5^c$ for quick processing, wherein a, b, and c are natural numbers. Therefore, in some embodiments, M/k is an integer when k=1, 2, 3, 4, 5, 6, or 8 Therefore, in some embodiments, k might not be equal to seven because if k=7 then M/k might not be an integer.

FIGS. 16 and 17 illustrate examples of the following principle: if time domain interpolation for channel estimation is not necessary or desired, e.g. because the relative speed between the transmitting device 302 and the receiving device 312 is low (e.g. the UE 110 is slow moving), then reference symbol overhead may be reduced over time duration $t_D$, by only transmitting one reference symbol and increasing the SCS of that reference symbol compared to the SCS of the data symbols. The reference symbol overhead may be reduced dynamically or semi-statically, e.g. by the base station 170 indicating the reduction based on the speed of the UE 110.

Mapping to Reference Symbol Patterns

In some embodiments, a mapping may be stored at the transmitting device 302 and the receiving device 312, which maps different indications of SCS of the reference symbol(s) to different reference symbol patterns, e.g. to different position locations in the time duration $t_D$. In some embodiments, the mapping may be based on an absolute/explicit indication of the SCS of the reference symbol(s). For example, if the transmitting device 302 and the receiving device 312 receive an indication that the SCS is 30 kHz for the reference symbols, then the transmitting device 302 is to transmit the reference symbols according to the reference symbol pattern in FIG. 12: a reference symbol transmitted at position 2 and at position 14, each one carrying a respective different half of the M symbols of a reference sequence. The receiving device 312 is to receive the reference symbols according to the same reference symbol pattern. The indication may be generated by a network device. In some embodiments, the network device may the transmitting device 302 or the receiving device 312.

In some embodiments, the mapping may instead be based on an indication of ratio of SCS for reference symbols to SCS for data symbols. For example, FIG. 18 illustrates two tables 452 and 454, each illustrating a different possible example mapping. In table 452, each one of four indices maps to a respective different ratio of SCS for reference symbols to SCS for data symbols. Associated with each ratio is a corresponding indication of the reference symbol pattern in the form of an indication of the positions at which the reference symbols are located. The table 452 may be stored in the memory 310 of transmitting device 302 and the memory 320 of receiving device 312.

If the transmitting device 302 receives the index "1", then the transmitting device 302 knows from table 452 that the SCS is the same for both the reference symbols and the data symbols, and that a single reference symbol is to be transmitted at position 1 of the time duration $t_D$, e.g. as shown in FIG. 10. Similarly (or instead), if the receiving device 312 receives the index "1", then the receiving device 312 knows from table 452 that the SCS is the same for both the reference symbols and the data symbols, and that a single reference symbol is to be received at position 1 of the time duration $t_D$, e.g. as shown in FIG. 10.

If the transmitting device 302 receives the index "2", then the transmitting device 302 knows from table 452 that the SCS for the reference symbols is twice as large as for the data symbols, and that two reference symbols are to be respectively transmitted at positions 2 and 14 of the time duration $t_D$, each one carrying a respective different half of the symbols of a reference sequence, e.g. as shown in FIG. 12. Similarly (or instead), if the receiving device 312 receives the index "2", then the receiving device 312 knows from table 452 that the SCS for the reference symbols is twice as large as for the data symbols, and that two reference symbols are to be respectively received at positions 2 and 14 of the time duration $t_D$, each one carrying a respective different half of the symbols of a reference sequence, e.g. as shown in FIG. 12.

If the transmitting device 302 receives the index "3", then the transmitting device 302 knows from table 452 that the SCS for the reference symbols is three times as large as for the data symbols, and that three reference symbols are to be respectively transmitted at positions 3, 8, and 13 of the time duration $t_D$, each one carrying a respective different third of the symbols of a reference sequence, e.g. as shown in FIG. 13. Similarly (or instead), if the receiving device 312 receives the index "3", then the receiving device 312 knows from table 452 that the SCS for the reference symbols is three times as large as for the data symbols, and that three reference symbols are to be respectively received at positions 3, 8, and 13 of the time duration $t_D$, each one carrying a respective different third of the symbols of a reference sequence, e.g. as shown in FIG. 13.

If the transmitting device 302 receives the index "4", then the transmitting device 302 knows from table 452 that the SCS for the reference symbols is four times as large as for the data symbols, and that four reference symbols are to be respectively transmitted at positions 1, 6, 12, and 17 of the time duration $t_D$, each one carrying a respective different quarter of the symbols of a reference sequence, e.g. as shown in FIG. 14. Similarly (or instead), if the receiving device 312 receives the index "4", then the receiving device 312 knows from table 452 that the SCS for the reference symbols is four times as large as for the data symbols, and that four reference symbols are to be respectively received at positions 1, 6, 12, and 17 of the time duration $t_D$, each one carrying a respective different quarter of the symbols of a reference sequence, e.g. as shown in FIG. 14.

Table 454 is a variation of table 452 in which the reference symbol pattern indicated in the right-most column of table 454 is indicated in terms of position from the last symbol in time duration $t_D$. The reference symbol pattern is different in table 454 compared to table 452. In table 454, it is assumed that there are L time positions in time duration $t_D$, e.g. each time position a respective different location in time in which a multi-carrier symbol is transmitted. For example, L may be the total number of multi-carrier symbols assigned for a particular transmission. The index "1" maps to a single reference symbol, of the same SCS as the data symbols, transmitted at position 1. The index "2" maps to two reference symbols, each having twice the SCS compared to data symbols, and one transmitted at position 1 and the other transmitted at position L (i.e. the last position). The index "3" maps to three reference symbols, each having three times the SCS compared to data symbols, and one transmitted at position 1, the other transmitted at position L−3, and the third transmitted at position L. The index "4" maps to four reference symbols, each having four times the SCS compared to data symbols, and one transmitted at position 1, the other transmitted at position L−6, the third transmitted at position L−3, and the fourth transmitted at position L.

In some embodiments, the SCS for reference symbol(s), or the ratio of SCS for reference symbols to SCS for data symbols, is instead indicated by indicating IDFT size. For example, FIG. 19 illustrates a table 456 that is the same as table 452 of FIG. 17, except that ratio of IDFT size for reference symbols to IDFT size for data symbols is indicated in the middle column of the table. In some embodiments, the IDFT size for reference symbols may instead be explicitly indicated and mapped to different reference symbol patterns, e.g. when an IDFT size of N=512 is indicated, it maps to the reference symbol pattern illustrated in FIG. 12.

In some embodiments, the indices in the mappings (e.g. the mappings in FIGS. 18 and 19) may map to different associated reference symbol patterns depending upon whether it is an uplink channel or a downlink channel. For example, index "1" of table 452 in FIG. 18 may map to a single reference symbol at position 1 (as shown in FIG. 10) for the PUSCH, and may instead map to a single reference symbol at position 4 for the PDSCH. In some embodiments, the mappings in FIGS. 18 and 19 are for uplink channel only, and there may be different mappings for the downlink channel.

The specific mappings in FIGS. 18 and 19 are only examples. As another example, for a particular mapping for an uplink channel: index 1 may map to SCS (and IDFT size) being the same for both the reference symbols and the data symbols, with a single reference symbol transmitted at position/symbol 1 of the time duration $t_D$; index 2 may map to SCS being twice as large for reference symbols compared to data symbols (IDFT half the size for reference symbols compared to data symbols), and two reference symbols each carrying a respective different half of a reference sequence are transmitted at positions/symbols 1 and 5 of the time duration $t_D$; index 3 may map to SCS being three times as large for reference symbols compared to data symbols (IDFT one third the size for reference symbols compared to data symbols), and three reference symbols each carrying a respective different third of a reference sequence are transmitted at positions/symbols 1, 5, and 8 of the time duration $t_D$; index 4 may map to SCS being four times as large for reference symbols compared to data symbols (IDFT one quarter the size for reference symbols compared to data symbols), and four reference symbols each carrying a respective different quarter of a reference sequence are transmitted at positions/symbols 1, 5, 8, and 11 of the time duration $t_D$.

In some embodiments, the mapping may be predefined, e.g. fixed or defined in a standard, or semi-statically configured, e.g. using higher-layer signaling such as radio resource control (RRC) signaling or a medium access control (MAC) control element (CE) or MAC header. The transmitting device 302 and/or receiving device 312 may then be sent the index, e.g. in control signaling, on a dynamic basis (e.g. in physical layer control information, such as downlink control information (DCI)) or semi-static basis (e.g. in higher-layer signaling), and use the index to map to a corresponding SCS for the reference symbols, which also maps to an associated reference symbol pattern. In this way, dynamically or semi-statically changing the reference symbol pattern may be performed with relatively low overhead, e.g. by just signaling the index. As the channel conditions and/or service requirements or application scenarios change, the reference symbol pattern may be changed and the change signaled via signaling the index to the transmitting device 302 and/or receiving device 312, as needed. The index may be alternatively referred to as an indicator.

In some embodiments, the index may specific to a UE, e.g. specific to UE 110. In other embodiments, the index might not be specific to a UE but instead applicable to multiple UEs, e.g. the index is group-cast or broadcast to some or all UEs. In some embodiments, the mapping (e.g. in FIGS. 18 and 19) may be established/configured/indicated for a group of UEs or all UEs, but the index may be UE-specific or specific to just one group of UEs. For example, a first UE may be slow moving, such that the index 1 is indicated for the first UE, whereas a second UE may be fast moving, such that index 3 is indicated for the second UE. In some embodiments, one or more UEs for which faster decoding of data is favoured may be signaled an index in which reference symbol(s) is/are not as distributed in time, e.g. index 1. Whereas, one or more other UEs for which channel estimation performance is favoured may be signaled an index in which reference symbols are more distributed in time, e.g. index 4.

In some embodiments, the mapping itself, e.g. the mappings in any of FIGS. 18 to 19, may be indicated and/or configured using physical layer control information, e.g. DCI.

In some embodiments, the reference symbol pattern for a channel may be changed over time, e.g. by a network device such as base station 170, as need be. For example, when the UE 110 is moving at a high speed, such that the Doppler shift frequency of the wireless channel between the base station 170 and UE 110 is high, the wireless channel may differ between OFDM symbols during time duration $t_D$. In such situations, interpolation for channel estimation using more than one position in time duration $t_D$ may be desired, e.g. index 3 or index 4. However, if the UE 110 subsequently changes to stationary or moving at a lower speed, the wireless channel might no longer differ between OFDM symbols during time duration $t_D$. In such situations, interpolation for channel estimation using more than one position in time duration $t_D$ might not be necessary or less necessary, e.g. index 1 or index 2. The change in index may be indicated in a dynamic or semi-static fashion. Speed is only one example factor that may determine which index to use.

Note that if the transmitting device 302 is the device that determines to change the reference symbol pattern, the index might only need to be signaled from the transmitting device 302 to the receiving device 312. If the receiving device 312 is the device that determines to change the reference symbol pattern, the index might only need to be signaled from the receiving device 312 to the transmitting device 302. If a device separate from the transmitting device 302 and the receiving device 312 (e.g. a network device such as a base station, or a master UE) determines to change the reference symbol pattern, the index may need to be signaled from that device to both the transmitting device 302 and the receiving device 312.

By using a mapping, e.g. as discussed above in relation to FIGS. 18 to 19, the number of reference symbol patterns and/or implementation complexity may be reduced compared to some implementations within NR. The position(s) of reference symbol(s) may be predefined for different SCS/IDFT sizes, which may be expressed in terms of ratio (e.g. ratio of SCS of reference symbols to SCS of data symbols, or ratio of IDFT size of reference symbols to IDFT size of data symbols). An index may be used to select/indicate one of the predefined relationships in the mapping.

In some embodiments, the position of the reference symbols may be defined independent of the length of the transmission time interval (TTI), e.g. regardless of the length of time duration $t_D$ illustrated in the examples herein. Thus, in some embodiments the overhead of the reference symbols (e.g. in terms of number of symbols of a reference sequence and/or total time duration of the reference symbols) may be fixed regardless of the TTI length and/or regardless of the number of positions in which reference symbols are transmitted.

Example Methods

Figure 20:
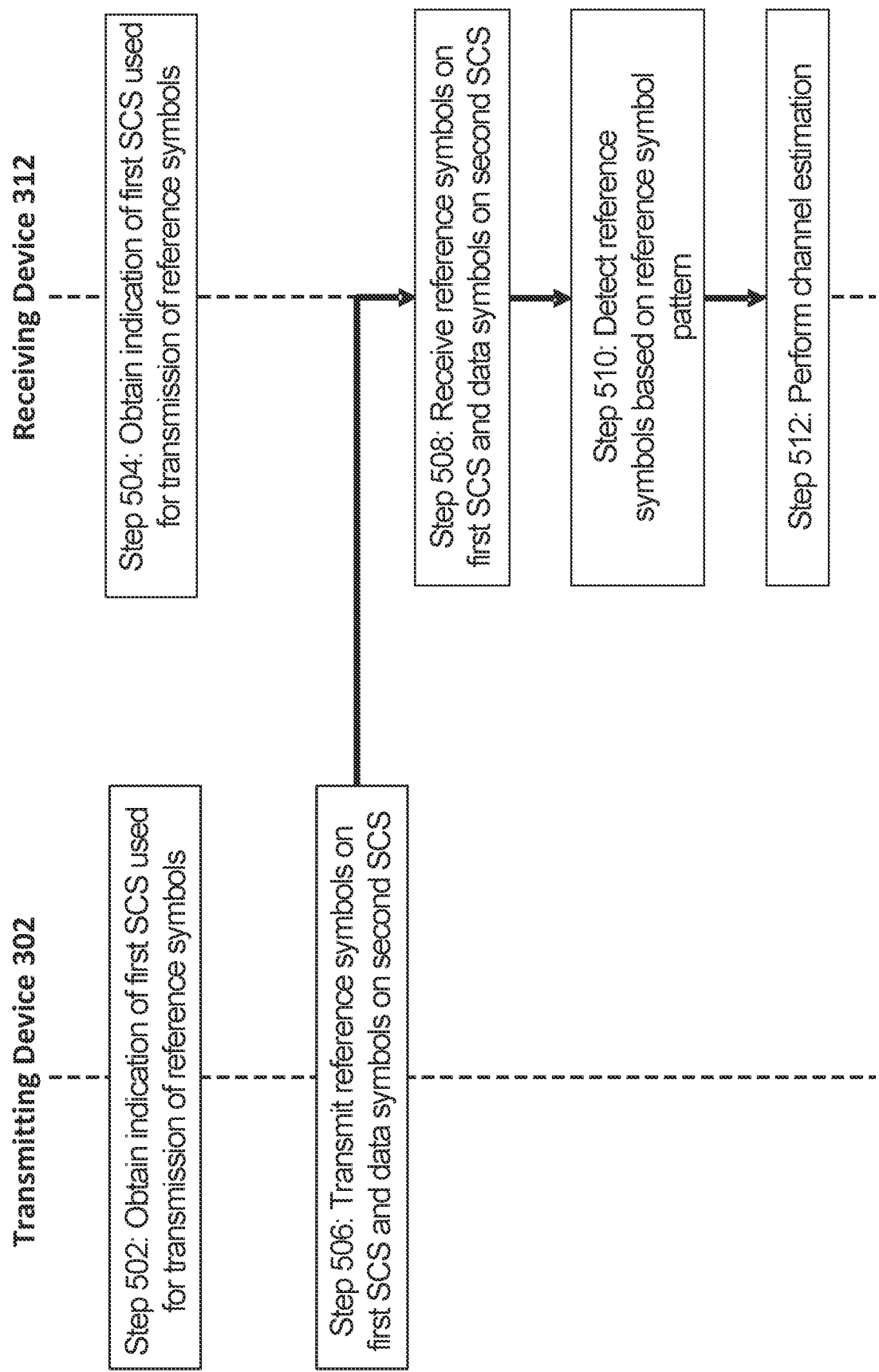
FIGS. 20 and 21 are methods for wireless communication, according to various embodiments.

FIG. 20 illustrates a method performed by two devices, according to one embodiment. The two devices are assumed to be transmitting device 302 and receiving device 312, but this is only an example. More generally, the two devices may be any two devices that can wirelessly communicate with each other.

At step 502, the transmitting device 302 determines an indication of a first SCS used for transmission of reference symbols, and at step 504 the receiving device 312 obtains an indication of the first SCS used for transmission of reference symbols.

Steps 502 and 504 might or might not happen in parallel. In some embodiments, the transmitting device 302 may first determine the indication, and then the transmitting device 302 transmits the indication to the receiving device 312. For example, step 502 may include the transmitting device 302 generating the indication based on the speed of the receiving device 312 relative to the transmitting device 302. The transmitting device 302 may then transmit the indication to the receiving device 312. Step 504 may include obtaining the indication at the receiving device 312 by receiving the indication from the transmitting device 302. In some such embodiments, the transmitting device 302 may be a network device (e.g. a base station) and the receiving device 312 may be a UE.

In other embodiments, the receiving device 312 may first determine the indication, and then the receiving device 312 transmits the indication to the transmitting device 302. For example, step 504 may include the receiving device 312 generating the indication based on the speed of the transmitting device 302 relative to the receiving device 312. The receiving device 312 may then transmit the indication to the transmitting device 302. Step 502 may include obtaining the indication at the transmitting device 302 by receiving the indication from the receiving device 312. In some such embodiments, the receiving device 312 may be a network device (e.g. a base station) and the transmitting device 302 may be a UE.

In other embodiments, both the transmitting device 302 and the receiving device 312 may obtain the indication from the network, e.g. by unicast, groupcast, or broadcast transmission. For example, step 502 may include the transmitting device 302 obtaining the indication by receiving the indication from a network device, e.g. a base station, and step 504 may include the receiving device 312 obtaining the indication by also receiving the indication from the network device. In some such embodiments, both the transmitting device 302 and the receiving device 312 may both be UEs.

In some embodiments, one of the devices may receive the indication from a network device (e.g. a base station) and then forward the indication to the other device.

At step 506, the transmitting device 302 transmits one or more reference symbols based on the first SCS and one or more data symbols based on a second SCS. In the remainder of FIG. 20 it will be assumed that multiple data symbols and multiple reference symbols are transmitted, e.g. as is the case in the examples in FIGS. 12 to 15.

The reference symbols are transmitted according to a reference symbol pattern. That is, the reference symbols are transmitted at particular positions in time according to the reference symbol pattern. Example reference symbol patterns are illustrated in FIGS. 10 to 17. The reference symbol pattern may be based on the indication of the first SCS.

At step 508, the receiving device 312 receives the reference symbols based on the first SCS and the data symbols based on the second SCS. The reference symbols are received at the time positions (e.g. multi-carrier symbol positions) according to the reference symbol pattern.

At step 510, the receiving device 312 detects the reference symbols based on the reference symbol pattern. For example, the receiving device 312 knows from the reference symbol pattern the time positions (e.g. multi-carrier symbol positions) at which the reference symbols are located. The receiving device 312 therefore obtains the reference symbols at those time-frequency locations. In some embodiments, "detect" may include attempting to find the reference sequence on the physical layer resources at which the reference symbols are transmitted. This task of detection might require testing a hypothesis assuming a known reference sequence on a certain physical resource in order to find the signal of interest. In some implementations, after the physical layer signal of interest is found, the quality of the signal is measured using e.g. the reference signal received power (RSRP) and if that signal's RSRP is above a certain threshold, then the physical layer signal is considered to be "detected". At step 512 the receiving device 312 uses the reference symbol(s) to perform channel estimation. In some embodiments, the channel estimation may be part of step 510 instead, e.g. as part of or subsequent to the detecting.

In some embodiments, steps 510 and 512 are optional, e.g. if the method ends upon reception of the reference symbols on the first SCS. In some embodiments, step 510 and possibly also step 512 are performed as part of the receiving step 508. For example, receiving the reference symbols based on the first SCS in step 508 may comprise detecting the reference symbols and performing channel estimation based on detected reference symbols.

In some embodiments, the one or more reference symbols are time-multiplexed with the data symbols, e.g. like in the examples in FIGS. 10 to 17. In some embodiments, a position in time of each of the one or more reference symbols is based on the indication of the first SCS, e.g. as per the tables in FIGS. 18 and 19. In some embodiments, the reference symbols and the data symbols are OFDM symbols.

In some embodiments in step 502 and/or step 504, the first SCS is indicated by indicating a ratio of the first SCS and the second SCS, e.g. like in FIG. 18. In some embodiments in step 502 and/or step 504, the first SCS is indicated by indicating an IDFT size corresponding to the first SCS. In some embodiments, the IDFT size is a first IDFT size, a second IDFT size corresponds to the second SCS, and the first IDFT size is indicated by indicating a ratio of the first IDFT size and the second IDFT size, e.g. like in FIG. 19.

In some embodiments, obtaining the indication of the first SCS in step 502 and/or step 504 comprises receiving the indication in physical layer signaling (e.g. DCI) and/or in RRC signaling and/or in a MAC CE and/or in a MAC header.

In some embodiments, the first SCS is the same as the second SCS, e.g. like in the example in FIG. 10 and like in the first row of table 452 of FIG. 18. In some embodiments, the first SCS is different from the second SCS. In some embodiments, the first SCS may be smaller than the second SCS, e.g. to transmit more symbols of a reference sequence in a single reference symbol. However, in the examples explained earlier the first SCS is instead larger than the second SCS, which provides the benefit (e.g. reference symbol spread and overhead benefit) described herein. In some embodiments, the first SCS is k times larger than the second SCS, and within a particular time duration $t_D$ there are k reference symbols, each carrying a respective different set of M/k symbols of a reference sequence. k is a natural number greater than zero, M is a natural number greater than k, and $t_D$ is a real number greater than zero. Examples are illustrated in FIGS. 12 to 14. In some embodiments, a length of each of the k reference symbols is $1/k^{th}$ the length of a data symbol used to transmit data, e.g. like in the examples in FIGS. 12 to 14.

In some embodiments, transmitting the reference symbols on the first SCS includes transmitting a first OFDM symbol having a first portion generated from a first IDFT operation having an IDFT size corresponding to the first SCS. An example is FIG. 9 in which the "first portion" is the portion comprising the N/2 samples. In some embodiments, transmitting the data symbols on the second SCS includes transmitting a second OFDM symbol having a second portion generated from a second IDFT operation having an IDFT size corresponding to the second SCS. An example is FIG. 7 in which the "second portion" is the portion comprising N samples. In some embodiments, DFT spreading is performed prior to the second IDFT operation and not prior to the first IDFT operation, e.g. as is the case in FIGS. 9 and 7.

In some embodiments, the method of FIG. 20 may include (e.g. prior to step 502 and 504) obtaining a mapping that associates each index of a set of indices with a respective different first SCS and associated reference symbol pattern. Examples of such mappings are illustrated in FIGS. 18 and 19. Obtaining the indication of the first SCS in step 502 and/or 504 may include obtaining (e.g. possibly on a dynamic or semi-static basis) an indication of one index of the set of indices.

Figure 21:
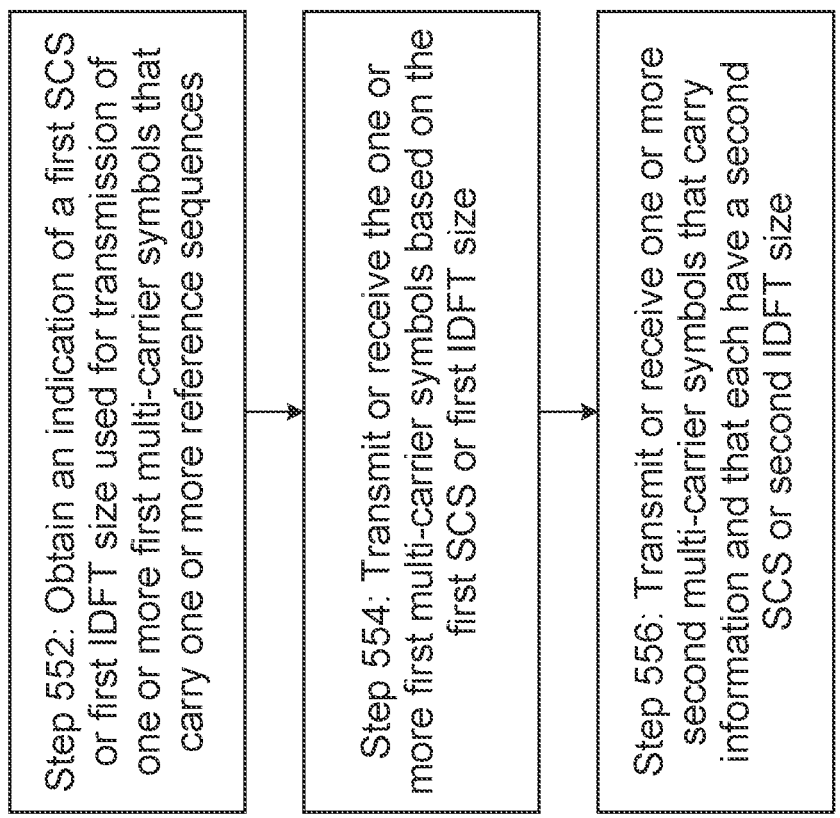

FIG. 21 is a method for wireless communication, according to another embodiment. The method is performed by a device, which may be transmitting device 302 or receiving device 312. At step 552, the device obtains an indication of a first SCS or first IDFT size used for transmission of one or more first multi-carrier symbols that carry one or more reference sequences. The one or more reference sequences are used for channel estimation. Each of the one or more first multi-carrier symbols is referred to above as a reference symbol.

At step 554, the device communicates (e.g. transmits if it is transmitting device 302 or receives if it is receiving device 312) the one or more first multi-carrier symbols based on the first SCS or first IDFT size. At step 556, the device communicates (e.g. transmits if it is transmitting device 302 or receives if it is receiving device 312) one or more second multi-carrier symbols that carry information and that each have a second SCS or second IDFT size. Each of the one or more second multi-carrier symbols may be referred to as a data symbol. However, more generally information is carried, which may be data, but may also or instead be other information that is not data and that is not a reference sequence, e.g. control information. Therefore, each of the one or more second multi-carrier symbols may instead be referred to (more generally) as an information symbol.

In some embodiments, the method of FIG. 21 may include obtaining an indication of the second SCS or second IDFT size.

In some embodiments, the one or more first multi-carrier symbols are time-multiplexed with the one or more second multi-carrier symbols, e.g. as is the case in the examples in FIGS. 10 to 17. In some embodiments, a position in time of each of the one or more first multi-carrier symbols is based on the indication of the first SCS or the first IDFT size.

In some embodiments, the first SCS is the same as the second SCS, and the first IDFT size is the same as the second IDFT size, e.g. as is the case in the examples in FIGS. 10 and 11. In some embodiments, the first SCS is different from the second SCS, and the first IDFT size is different from the second IDFT size. In some embodiments, the first SCS is larger than the second SCS, and the first IDFT size is smaller than the second IDFT size, e.g. as is the case in the examples in FIGS. 12 to 17.

In some embodiments, the first SCS is k times larger than the second SCS, and within a particular time duration $t_D$ there are k of the first multi-carrier symbols, each carrying a respective reference sequence. k is a natural number greater than zero, and $t_D$ is a real number greater than zero. In some embodiments, each one of the k first multi-carrier symbols carries a respective different portion of an original reference sequence. In some embodiments, the original reference sequence was M symbols, and each one of the k first multi-carrier symbols carries a respective different set of M/k symbols of the original reference sequence, wherein M is a natural number (e.g. as may be the case in the examples in FIGS. 12 to 15). In some embodiments, each one of the k first multi-carrier symbols carries a respective different reference sequence. Alternatively, in some embodiments, some or all of the k first multi-carrier symbols carries a same reference sequence. In some embodiments, a length of each of the k first multi-carrier symbols is $1/k^{th}$ the length of each of the one or more second multi-carrier symbols. In some embodiments, k is one of the following possible values: 1, 2, 3, 4, 5, 6, or 8.

In some embodiments, the first SCS is indicated by indicating a ratio of the first SCS and the second SCS, e.g. like in FIG. 18. In some embodiments, the first IDFT size is indicated by indicating a ratio of the first IDFT size and the second IDFT size, e.g. like in FIG. 19.

In some embodiments, obtaining the indication of the first SCS or first IDFT size includes receiving the indication in physical layer control information (e.g. in DCI) and/or in RRC signaling and/or in a MAC CE and/or in a MAC header.

In some embodiments, the one or more first multi-carrier symbols and the one or more second multi-carrier symbols are each OFDM symbols.

In some embodiments, the information does not include any symbols of a reference sequence. In some embodiments, the information is data and/or control information.

In some embodiments, transmitting a first multi-carrier symbol includes transmitting a first OFDM symbol comprising a first portion generated from a first IDFT operation having the first IDFT size. In some embodiments, transmitting a second multi-carrier symbol comprises transmitting a second OFDM symbol comprising a second portion generated from a second IDFT operation having the second IDFT size. In some embodiments, DFT spreading is performed prior to the second IDFT operation, e.g. like in FIG. 7. In some embodiments, DFT spreading is not performed prior to the first IDFT operation, e.g. like in FIGS. 8 and 9.

In some embodiments, the method includes obtaining a mapping that associates each index of a set of indices with a respective different first SCS or first IDFT size and associated position in time of each of the one or more first multi-carrier symbols. Examples of such mappings are illustrated in FIGS. 18 and 19. In some embodiments, obtaining the indication of the first SCS or first IDFT size comprises obtaining an indication of one index of the set of indices. In some embodiments, the mapping is obtained on a semi-static basis and the indication of the first SCS or first IDFT size is obtained on a dynamic basis. In some embodiments, the indication of the first SCS or first IDFT size is obtained on a semi-static basis. In some embodiments, obtaining the indication of the first SCS or first IDFT size includes receiving the indication of the first SCS or first IDFT size from a network device (e.g. a base station).

In some embodiments, the method of FIG. 21 is performed by a UE. If the UE is a transmitting device, the UE may transmit the one or more first multi-carrier symbols and the one or more second multi-carrier symbols. The symbols may be transmitted to a base station in an uplink transmission, or to another UE in a sidelink channel. If the UE is a receiving device, the UE may receive the one or more first multi-carrier symbols and the one or more second multi-carrier symbols. The symbols may be received from a base station in a downlink transmission, or from another UE in a sidelink channel. In some embodiments, the method of FIG. 21 is performed by a network device, e.g. a base station. The transmitting may be in the downlink to a UE, or to another network device, e.g. over a backhaul link. The receiving may be in the uplink from a UE, or from another network device, e.g. over a backhaul link.

In some embodiments, a system (such as an apparatus) is provided to perform any of the methods herein, e.g. the system may be transmitting device 302 or receiving device 312. The system might be a network device (e.g. base station) or UE or another device or a circuit chip in a device. In some embodiments, the system includes a memory to store information, such as the indication of first SCS or first IDFT used for transmission of reference symbols. In some embodiments, the memory stores processor-executable instructions. The processor may execute the instructions to cause the processor to perform operations such as obtaining the indication of the first SCS or first IDFT, causing communication (e.g. transmission or reception) of the one or more first multi-carrier symbols based on the first SCS or first IDFT size, and causing communication (e.g. transmission or reception) of the one or more second multi-carrier symbols based on the second SCS or second IDFT size. Causing communication in the case of transmission may include outputting the symbols to be transmitted from the processor and/or instructing a transmitter to transmit the symbols, e.g. performing the multi-carrier symbol generation (such as in the manner discussed in relation to FIGS. 7 to 9) and then sending the multi-carrier symbols to a transmitter for transmission over one or more antennas or panels. Causing communication in the case of reception may include instructing or configuring a receiver to receive the multi-carrier symbols and/or may include performing detecting of the reference symbols, e.g. in the processor. "Receiving" a multi-carrier symbol may comprise receiving it as input at the processor, and "transmitting" a multi-carrier symbol may comprise transmitting it at an output of the processor, e.g. if the system performing the method is a circuit chip.

In some embodiments, the channel estimation discussed herein may be performed using minimum mean square error (MMSE) or another technique. The received reference sequence may be expressed as the transmitted reference sequence multiplied by the channel and with the noise added. The transmitted reference sequence is known, and therefore the recipient of the reference sequence, e.g. the receiving device 312, can estimate the value of the channel using the received symbols of the reference sequence and the known transmitted symbols of the reference sequence.

Embodiments described herein may provide a good balance between channel estimation performance and reference symbol overhead, possibly achieving time domain channel estimation and equalization even while maintaining relatively low reference symbol overhead, especially for when DFT spreading is used for data symbols. Lower implementation complexity may be possible compared to reference symbol design in NR.

SOME EXAMPLES

Example 1: A method for wireless communication comprising: obtaining an indication of a first subcarrier spacing (SCS) or first inverse discrete Fourier transform (IDFT) size; communicating at least one first multi-carrier symbol that carries at least one reference sequence based on the first SCS or first IDFT size; communicating at least one second multi-carrier symbol that carries information based on a second SCS or second IDFT size.

Example 2: The method of Example 1, further comprising obtaining a mapping that associates each index of a set of indices with a respective different first SCS or first IDFT size and associated position in time of each of the at least one first multi-carrier symbol; and wherein obtaining the indication of the first SCS or first IDFT size comprises obtaining an indication of one index of the set of indices.

Example 3: The method of Example 2, wherein the mapping is obtained on a semi-static basis and the indication of the first SCS or first IDFT size is obtained on a dynamic basis or on a semi-static basis.

Example 4: The method of Example 1, wherein a position in time of each of the at least one first multi-carrier symbol is based on the indication of the first SCS or the first IDFT size.

Example 5: The method of any one of Examples 1 to 4, wherein the first SCS is larger than the second SCS, and wherein the first IDFT size is smaller than the second IDFT size.

Example 6: The method of Example 5, wherein the first SCS is k times larger than the second SCS, and wherein within a particular time duration $t_D$ there are k first multi-carrier symbols, each carrying a respective reference sequence, wherein k is a natural number greater than zero, and $t_D$ is a real number greater than zero.

Example 7: The method of Example 6, wherein each one of the k first multi-carrier symbols carries a respective different portion of an original reference sequence.

Example 8: The method of Example 7, wherein the original reference sequence was M symbols, and each one of the k first multi-carrier symbols carries a respective different set of M/k symbols of the original reference sequence, wherein M is a natural number.

Example 9: The method of Example 6, wherein each one of the k first multi-carrier symbols carries a respective different reference sequence.

Example 10: The method of Example 6, wherein some or all of the k first multi-carrier symbols carries a same reference sequence.

Example 11: The method of any one of Examples 6 to 10, wherein a length of each of the k first multi-carrier symbols is $1/k^{th}$ the length of each of the at least one second multi-carrier symbol.

Example 12: The method of any one of Examples 6 to 11, wherein k is one of the following possible values: 1, 2, 3, 4, 5, 6, or 8.

Example 13: The method of any one of Examples 1 to 12, wherein the first SCS is indicated by indicating a ratio of the first SCS and the second SCS.

Example 14: The method of any one of Examples 1 to 13, wherein the first IDFT size is indicated by indicating a ratio of the first IDFT size and the second IDFT size.

Example 15: The method of any one of Examples 1 to 14, wherein obtaining the indication of the first SCS or first IDFT size comprises at least one of the following: receiving the indication in physical layer control information; receiving the indication in radio resource control (RRC) signaling; receiving the indication in a medium access control (MAC) control element (CE);

receiving the indication in a MAC header; receiving the indication in downlink control information (DCI).

Example 16: The method of any one of Examples 1 to 15, wherein the information does not include any symbols of a reference sequence; and the information is data.

Example 17: The method of any one of Examples 1 to 16, wherein: transmitting a first multi-carrier symbol comprises transmitting a first OFDM symbol comprising a first portion generated from a first IDFT operation having the first IDFT size; transmitting a second multi-carrier symbol comprises transmitting a second OFDM symbol comprising a second portion generated from a second IDFT operation having the second IDFT size; wherein discrete Fourier transform (DFT) spreading is performed prior to the second IDFT operation.

Example 18: The method of any one of Examples 1 to 17, wherein each of the at least one first multi-carrier symbol is a reference symbol and each of the at least one second multi-carrier symbol is an information symbol.

Example 19: The method of any one of Examples 1 to 18, wherein the at least one first multi-carrier symbol is time-multiplexed with the at least one second multi-carrier symbol.

Example 20: The method of any one of Examples 1 to 19, wherein the method is performed by a user equipment (UE) or a network device.

Example 21: An apparatus comprising: a memory to store processor-executable instructions; a processor that, upon execution of the processor-executable instructions, causes the processor to: obtain an indication of a first subcarrier spacing (SCS) or first inverse discrete Fourier transform (IDFT) size; cause communication of at least one first multi-carrier symbol that carries at least one reference sequence based on the first SCS or first IDFT size; cause communication of at least one second multi-carrier symbol that carries information based on a second SCS or second IDFT size.

Example 22: The apparatus of Example 21, wherein upon execution of the processor-executable instructions, the processor is to obtain a mapping that associates each index of a set of indices with a respective different first SCS or first IDFT size and associated position in time of each of the at least one first multi-carrier symbol; and wherein the processor is to obtain the indication of the first SCS or first IDFT size by obtaining an indication of one index of the set of indices.

Example 23: The apparatus of Example 22, wherein the mapping is obtained on a semi-static basis and the indication of the first SCS or first IDFT size is obtained on a dynamic basis or on a semi-static basis.

Example 24: The apparatus of Example 21, wherein a position in time of each of the at least one first multi-carrier symbol is based on the indication of the first SCS or the first IDFT size.

Example 25: The apparatus of any one of Examples 21 to 24, wherein the first SCS is larger than the second SCS, and wherein the first IDFT size is smaller than the second IDFT size.

Example 26: The apparatus of Example 25, wherein the first SCS is k times larger than the second SCS, and wherein within a particular time duration $t_D$ there are k first multi-carrier symbols, each carrying a respective reference sequence, wherein k is a natural number greater than zero, and $t_D$ is a real number greater than zero.

Example 27: The apparatus of Example 26, wherein each one of the k first multi-carrier symbols carries a respective different portion of an original reference sequence.

Example 28: The apparatus of Example 27, wherein the original reference sequence was M symbols, and each one of the k first multi-carrier symbols carries a respective different set of M/k symbols of the original reference sequence, wherein M is a natural number.

Example 29: The apparatus of Example 26, wherein each one of the k first multi-carrier symbols carries a respective different reference sequence.

Example 30: The apparatus of Example 26, wherein some or all of the k first multi-carrier symbols carries a same reference sequence.

Example 31: The apparatus of any one of Examples 26 to 30, wherein a length of each of the k first multi-carrier symbols is $1/k^{th}$ the length of each of the at least one second multi-carrier symbol.

Example 32: The apparatus of any one of Examples 26 to 31, wherein k is one of the following possible values: 1, 2, 3, 4, 5, 6, or 8.

Example 33: The apparatus of any one of Examples 21 to 32, wherein the first SCS is indicated by indicating a ratio of the first SCS and the second SCS.

Example 34: The apparatus of any one of Examples 21 to 33, wherein the first IDFT size is indicated by indicating a ratio of the first IDFT size and the second IDFT size.

Example 35: The apparatus of any one of Examples 21 to 34, wherein the indication of the first SCS or first IDFT size is obtained by at least one of the following: receiving the indication in physical layer control information; receiving the indication in radio resource control (RRC) signaling; receiving the indication in a medium access control (MAC) control element (CE); receiving the indication in a MAC header; receiving the indication in downlink control information (DCI).

Example 36: The apparatus of any one of Examples 21 to 35, wherein the information does not include any symbols of a reference sequence; and the information is data.

Example 37: The apparatus of any one of Examples 21 to 36, wherein upon execution of the processor-executable instructions, the processor is to: obtain a first multi-carrier symbol by generating a first OFDM symbol comprising a first portion generated from a first IDFT operation having the first IDFT size; obtain a second multi-carrier symbol by generating a second OFDM symbol comprising a second portion generated from a second IDFT operation having the second IDFT size; perform discrete Fourier transform (DFT) spreading prior to the second IDFT operation.

Example 38: The apparatus of any one of Examples 21 to 37, wherein each of the at least one first multi-carrier symbol is a reference symbol and each of the at least one second multi-carrier symbol is an information symbol.

Example 39: The apparatus of any one of Examples 21 to 38, wherein the at least one first multi-carrier symbol is time-multiplexed with the at least one second multi-carrier symbol.

Example 40: The apparatus of any one of Examples 21 to 39, wherein the apparatus is a user equipment (UE) or network device.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method for wireless communication comprising:
    obtaining an indication of an index from a set of indices, the index indicating both: (1) a first subcarrier spacing (SCS) or first inverse discrete Fourier transform (IDFT) size, and (2) a respective position in time for each of at least one first multi-carrier symbol associated with the first SCS or the first IDFT size;
    communicating at least one reference sequence using the at least one first multi-carrier symbol associated with the first SCS or first IDFT size, wherein each of the at least one first multi-carrier symbol is located at the respective position in time as indicated by the index;
    communicating at least one second multi-carrier symbol that carries information based on a second SCS or second IDFT size.

2. The method of claim 1, further comprising obtaining a mapping that associates each index of the set of indices with a respective different first SCS or first IDFT size and associated position in time of each of the at least one first multi-carrier symbol.

3. The method of claim 1, wherein the respective position in time for each of the at least one first multi-carrier symbol is based on the indication of the first SCS or the first IDFT size.

4. The method of claim 1, wherein the first SCS is larger than the second SCS, and wherein the first IDFT size is smaller than the second IDFT size.

5. The method of claim 4, wherein the first SCS is k times larger than the second SCS, and wherein within a particular time duration $t_D$ there are k first multi-carrier symbols, each carrying a respective reference sequence, wherein k is a natural number greater than zero, and $t_D$ is a real number greater than zero.

6. The method of claim 5, wherein each one of the k first multi-carrier symbols carries a respective different portion of an original reference sequence.

7. The method of claim 6, wherein the original reference sequence was M symbols, and each one of the k first multi-carrier symbols carries a respective different set of M/k symbols of the original reference sequence, wherein M is a natural number.

8. The method of claim 5, wherein each one of the k first multi-carrier symbols carries a respective different reference sequence.

9. The method of claim 1, wherein the first SCS is indicated by indicating a ratio of the first SCS and the second SCS.

10. The method of claim 1, wherein the first IDFT size is indicated by indicating a ratio of the first IDFT size and the second IDFT size.

11. An apparatus comprising:
    a memory to store processor-executable instructions;
    a processor configured so that execution of the processor-executable instructions causes the processor to:
        obtain an indication of an index from a set of indices, the index indicating both: (1) a first subcarrier spacing (SCS) or first inverse discrete Fourier transform (IDFT) size, and (2) a respective position in time for each of at least one first multi-carrier symbol associated with the first SCS or the first IDFT size;
        cause communication of at least one reference sequence using the at least one first multi-carrier symbol associated with the first SCS or first IDFT size, wherein each of the at least one first multi-carrier symbol is located at the respective position in time as indicated by the index;
        cause communication of at least one second multi-carrier symbol that carries information based on a second SCS or second IDFT size.

12. The apparatus of claim 11, wherein upon execution of the processor-executable instructions, the processor is to obtain a mapping that associates each index of the set of indices with a respective different first SCS or first IDFT size and associated position in time of each of the at least one first multi-carrier symbol.

13. The apparatus of claim 11, wherein the respective position in time for each of the at least one first multi-carrier symbol is based on the indication of the first SCS or the first IDFT size.

14. The apparatus of claim 11, wherein the first SCS is larger than the second SCS, and wherein the first IDFT size is smaller than the second IDFT size.

15. The apparatus of claim 14, wherein the first SCS is k times larger than the second SCS, and wherein within a particular time duration $t_D$ there are k first multi-carrier symbols, each carrying a respective reference sequence, wherein k is a natural number greater than zero, and $t_D$ is a real number greater than zero.

16. The apparatus of claim 15, wherein each one of the k first multi-carrier symbols carries a respective different portion of an original reference sequence.

17. The apparatus of claim 16, wherein the original reference sequence was M symbols, and each one of the k first multi-carrier symbols carries a respective different set of M/k symbols of the original reference sequence, wherein M is a natural number.

18. The apparatus of claim 15, wherein each one of the k first multi-carrier symbols carries a respective different reference sequence.

19. The apparatus of claim 11, wherein the first SCS is indicated by indicating a ratio of the first SCS and the second SCS.

20. The apparatus of claim 11, wherein the first IDFT size is indicated by indicating a ratio of the first IDFT size and the second IDFT size.

\* \* \* \* \*